US010963151B2

(12) United States Patent
Lee et al.

(10) Patent No.: US 10,963,151 B2
(45) Date of Patent: Mar. 30, 2021

(54) IMAGE DISPLAY APPARATUS

(71) Applicant: LG ELECTRONICS INC., Seoul (KR)

(72) Inventors: Hyeseung Lee, Seoul (KR); Miyeon Kwon, Seoul (KR); Sangjin Ahn, Seoul (KR)

(73) Assignee: LG ELECTRONICS INC., Seoul (KR)

(*) Notice: Subject to any disclaimer, the term of this patent is extended or adjusted under 35 U.S.C. 154(b) by 28 days.

(21) Appl. No.: 16/012,122

(22) Filed: Jun. 19, 2018

(65) Prior Publication Data

US 2018/0364881 A1 Dec. 20, 2018

(30) Foreign Application Priority Data

Jun. 20, 2017 (KR) ........................ 10-2017-0078040

(51) Int. Cl.

| | |
|---|---|
| ***G06F 3/0485*** | (2013.01) |
| ***G06F 3/0481*** | (2013.01) |
| ***G06F 3/0488*** | (2013.01) |
| ***H04N 21/422*** | (2011.01) |
| ***H04N 21/41*** | (2011.01) |
| ***G06F 3/0484*** | (2013.01) |
| ***G06F 3/14*** | (2006.01) |
| ***H04N 21/47*** | (2011.01) |
| ***H04N 21/431*** | (2011.01) |

(52) U.S. Cl.

CPC .......... *G06F 3/0485* (2013.01); *G06F 3/0481* (2013.01); *G06F 3/0484* (2013.01); *G06F 3/04886* (2013.01); *G06F 3/1454* (2013.01); *H04N 21/4126* (2013.01); *H04N 21/42204* (2013.01); *H04N 21/42208* (2013.01); *H04N 21/4316* (2013.01); *H04N 21/47* (2013.01); *G06F 2203/04803* (2013.01); *G06F 2203/04806* (2013.01); *G09G 2340/045* (2013.01)

(58) Field of Classification Search

None

See application file for complete search history.

(56) References Cited

U.S. PATENT DOCUMENTS

| | | | | |
|---|---|---|---|---|
| 2003/0208751 A1 | 11/2003 | Kim et al. | | |
| 2010/0188579 A1* | 7/2010 | Friedman | H04N 5/45 | 348/565 |
| 2012/0040719 A1* | 2/2012 | Lee | G06F 3/1454 | 455/557 |

(Continued)

FOREIGN PATENT DOCUMENTS

| | | |
|---|---|---|
| JP | 2015-18077 A | 1/2015 |
| KR | 10-2015-0040125 A | 4/2015 |
| KR | 10-2015-0073573 A | 7/2015 |

*Primary Examiner* — Stephen T. Reed

(74) *Attorney, Agent, or Firm* — Birch, Stewart, Kolasch & Birch, LLP

(57) ABSTRACT

An image display apparatus includes a display, an interface to exchange data with a mobile terminal, and a controller to, when mirroring with the mobile terminal is performed, control to display a mirrored image corresponding to an image displayed on a display of the mobile terminal, and when a zoom-in display input for a first area being a part of the mirrored image is received in state that the mirrored image is displayed, control to display a zoomed-in image of the first area of the mirrored image on the display.

14 Claims, 38 Drawing Sheets

100
Ar2
Ar1
746
IND
740
745
720
727
741
600
200x
742
710
200

(56) References Cited

U.S. PATENT DOCUMENTS

2015/0288912 A1* 10/2015 Chun ................. H04N 21/4126
348/552
2017/0185276 A1* 6/2017 Lee ..................... G06F 3/04883

* cited by examiner

IMAGE DISPLAY APPARATUS

CROSS-REFERENCE TO RELATED APPLICATION

This application claims the benefit of Korean Patent Application No. 10-2017-0078040, filed on Jun. 20, 2017 in the Korean Intellectual Property Office, the disclosure of which is incorporated herein by reference.

BACKGROUND OF THE INVENTION

1. Field of the Invention

The present disclosure relates to an image display apparatus, and more particularly, to an image display apparatus for simply zooming in on a partial area during mirroring between a mobile terminal and the image display apparatus.

2. Description of the Related Art

An image display apparatus is a device having the functionality of displaying an image. A user may view various images through the image display apparatus.

Particularly, the image display apparatus may display a broadcast image. The image display apparatus may provide a broadcast program that a user has selected from among broadcast signals transmitted by broadcasting stations.

Various electronic devices may share data with such an image display apparatus. Particularly, active research has been made on mirroring between a mobile phone and an image display apparatus.

SUMMARY OF THE INVENTION

Therefore, the present disclosure has been made in view of the above problems, and an aspect of the present disclosure is to provide an image display apparatus for simply zooming in on a partial area during mirroring between a mobile terminal and the image display apparatus.

Another aspect of the present disclosure is to provide an image display apparatus for displaying a video played in a mobile terminal on a zoomed-in screen of the image display apparatus.

In an aspect of the present disclosure, the above and other objects can be accomplished by the provision of an image display apparatus including a display, an interface to exchange data with a mobile terminal, and a controller to, when mirroring with the mobile terminal is performed, control to display a mirrored image corresponding to an image displayed on a display of the mobile terminal, and when a zoom-in display input for a first area being a part of the mirrored image is received in state that the mirrored image is displayed, control to display a zoomed-in image of the first area of the mirrored image on the display.

In another aspect of the present disclosure, an image display apparatus includes a display, an interface to exchange data with a mobile terminal, and a controller to, upon receipt of a partial zoom-in display input in a state where the mobile terminal is mirrored on the image display apparatus, control to display a zoomed-in image of a partial area of a mirrored image received from the mobile terminal on the display.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Embodiments of the present disclosure will be described below in detail with reference to the attached drawings.

The terms ‘module’ and ‘unit’ used to signify components are used herein to help the understanding of the components and thus they should not be considered as having specific meanings or roles. Accordingly, the terms ‘module’ and ‘unit’ may be used interchangeably.

Figure 1:
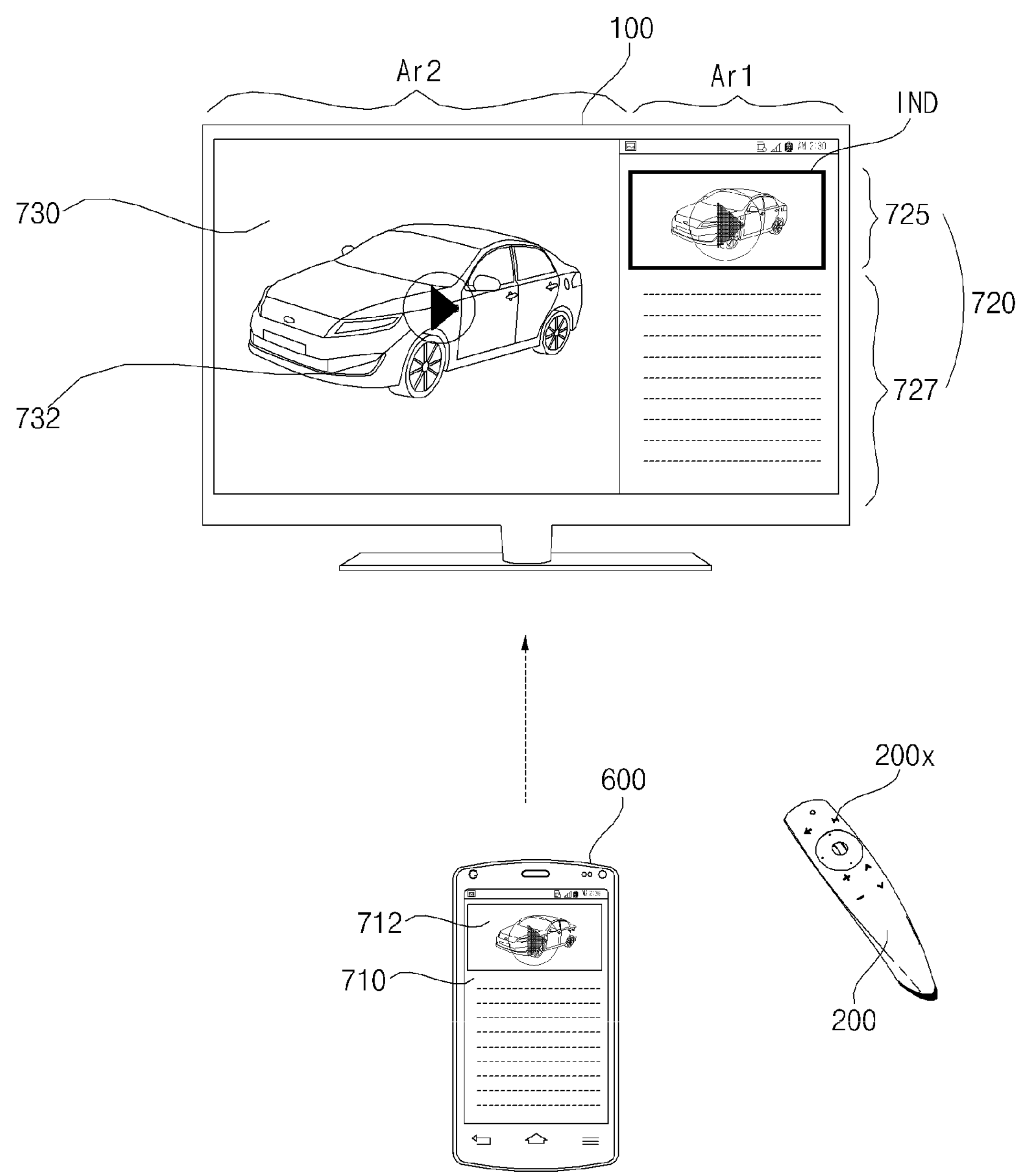
FIG. 1 is a view illustrating an image display system for mirroring according to an embodiment of the present disclosure.

FIG. 1 is a view illustrating an image display system for mirroring according to an embodiment of the present disclosure.

Referring to FIG. 1, an image display system 10 for mirroring may include an image display apparatus 100 and a mobile terminal 600.

The image display apparatus 100 and the mobile terminal 600 may perform mirroring.

To perform mirroring between the image display apparatus 100 and the mobile terminal 600, a wireless connection should be established between the image display apparatus 100 and the mobile terminal 600. For the wireless connection, the image display apparatus 100 and the mobile terminal 600 should first be paired with each other.

For example, upon selection of a mirroring application in the image display apparatus 100, the image display apparatus 100 may transmit a pairing request signal to the mobile terminal 600, and the mobile terminal 600 may transmit a pairing response signal to the image display apparatus 100 in response to the pairing request signal. The image display apparatus 100 may complete pairing with the mobile terminal 600 based on the pairing response signal, thereby establishing a wireless connection between the image display apparatus 100 and the mobile terminal 600.

In another example, upon selection of a mirroring application in the mobile terminal 600, the mobile terminal 600 may transmit a pairing request signal to the image display apparatus 100, and the image display apparatus 100 may transmit a pairing response signal to the mobile terminal 600 in response to the pairing request signal. The mobile terminal 600 may complete pairing with the image display apparatus 100 based on the pairing response signal, thereby establishing a wireless connection between the image display apparatus 100 and the mobile terminal 600.

During mirroring, the mobile terminal 600 may transmit an image displayed on a display 680 of the mobile terminal 600 to the image display apparatus 100.

Particularly, the mobile terminal 600 may transmit an image displayed on the display 680 of the mobile terminal 600, with additional black images added to the left and right sides of the image according to the resolution or aspect ratio of the image display apparatus 100.

According to this scheme, even though a display 180 of the image display apparatus 100 is large, the contents of a displayed mirrored image transmitted by the mobile terminal 600 may not be legible to a user.

In this context, to increase the legibility of a mirrored image, the present disclosure provides a method for displaying a zoomed-in image of a partial area of a mirrored image.

According to an embodiment of the present disclosure, the image display apparatus 100 may include the display 180, an interface 135 for exchanging data with the mobile terminal 600, and a controller 170 for, if the mobile terminal 600 is mirrored on the image display apparatus 100, controlling display of a mirrored image corresponding to an image displayed on the display 680 of the mobile terminal 600 on the display 180, and upon receipt of a zoom-in display input for a first area being a part of the mirrored image, controlling display of a zoomed-in image of the first area of the mirrored image on the display 180.

For example, a scaler (335 in FIG. 3) of the controller 170 in the image display apparatus 100 may scale up an image of the first area and control to display the scaled zoomed-in image.

Alternatively or additionally, if the image of the first area in the mirrored image is an image provided by an external server, the controller 170 of the image display apparatus 100 may request a zoomed-in image larger than the image displayed on the mobile terminal 600 to the external server, using a Uniform Resource Locator (URL) of the external server, and control to display a zoomed-in image received from the external server.

Thus, a zoomed-in image of a partial area may be simply displayed during mirroring between the mobile terminal 600 and the image display apparatus 100.

In the illustrated example of FIG. 1, with an image 710 including an image area 712 displayed on the mobile terminal 600, mirroring is performed between the mobile terminal 600 and the image display apparatus 100, and a mirrored image 720 is displayed in a first area Ar1 of the image display apparatus 100.

In the illustrated example of FIG. 1, an image area 725 of the mirrored image 720 having the image area 725 and a text area 727, displayed in the first area Ar1 of the image display apparatus 100, is highlighted by an indicator IND. With the indicator IND, a partial area of the mirrored image 720 may be displayed zoomed-in.

In the illustrated example of FIG. 1, a zoomed-in image 730 of the image area 725 of the mirrored image 720 may be displayed in a second area Ar2 of the image display apparatus 100.

As the zoomed-in image 730 of the image area 725 in the mirrored image 720 is displayed on the display 180 in this manner, the partial area may be displayed zoomed-in simply during mirroring between the mobile terminal 600 and the image display apparatus 100.

According to another embodiment of the present disclosure, the image display apparatus 100 includes the display 180, the interface 135 for exchanging data with the mobile terminal 600, and the controller 170 for, upon receipt of a partial zoom-in display request during mirroring between the mobile terminal 600 and the image display apparatus 100, controlling display of a zoomed-in image of a partial area of a mirrored image received from the mobile terminal 600 on the display 180. Therefore, a partial area may be displayed zoomed-in simply during mirroring between the mobile terminal 600 and the image display apparatus 100.

Various methods for operating the above-described image display apparatus 100 and mobile terminal 600 will be described later in detail with reference to FIG. 6 and other drawings.

The image display apparatus 100 illustrated in FIG. 1 may be any of a monitor, a TV, a tablet Personal Computer (PC), and so on.

Figure 2:
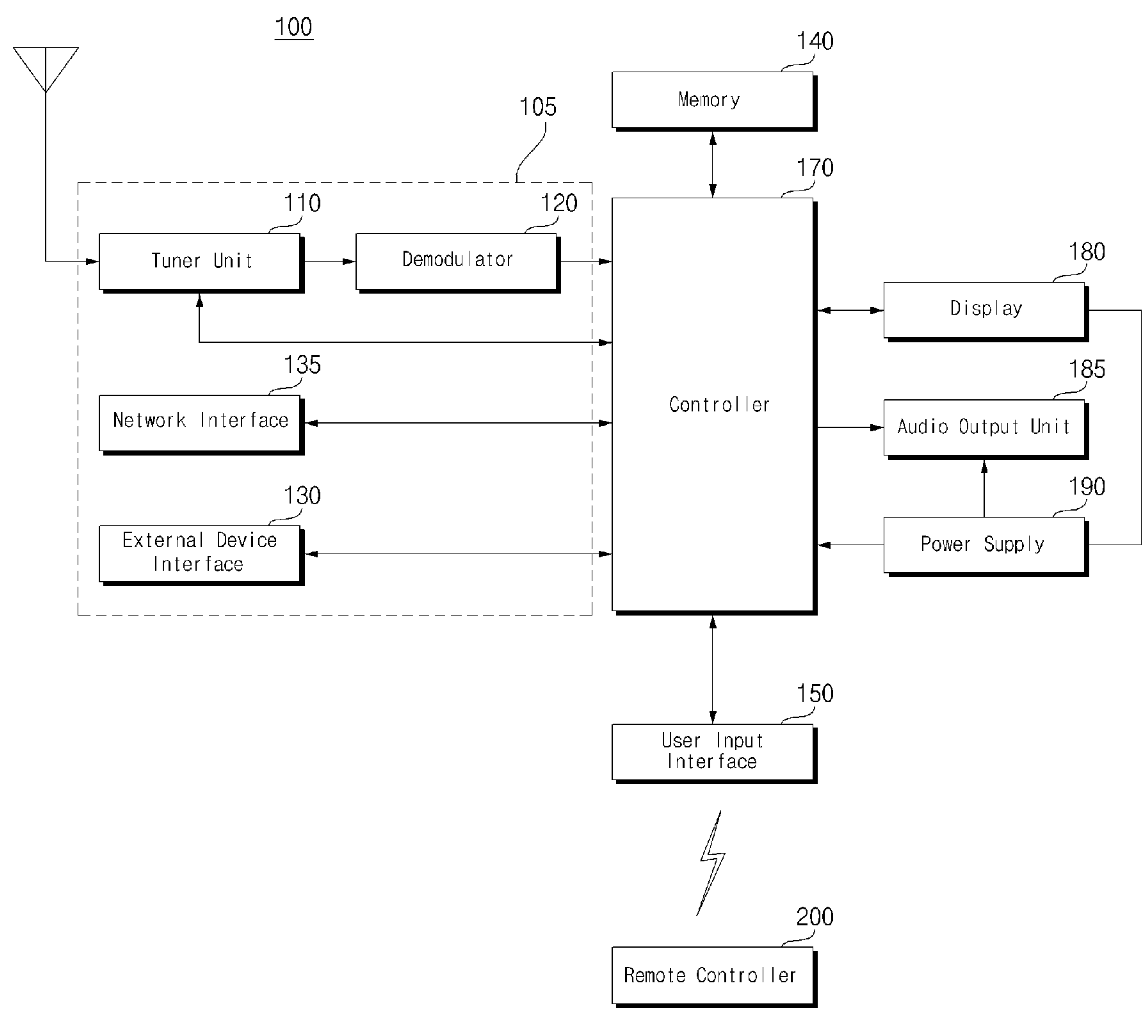
FIG. 2 is a block diagram illustrating an image display apparatus illustrated in FIG. 1.

FIG. 2 is a block diagram of the image display apparatus illustrated in FIG. 1.

Referring to FIG. 2, the image display apparatus 100 according to an embodiment of the present disclosure may include a broadcasting receiver 105, a memory 140, a user input interface 150, a sensor unit (not shown), a controller 170, the display 180, and an audio output unit 185.

The broadcasting receiver 105 may include a tuner unit 110, a demodulator 120, an external device interface 130, and a network interface 135.

Unlike FIG. 2, the broadcasting receiver 105 may include only the tuner unit 110, the demodulator 120, and the external device interface 130. That is, the broadcasting receiver 105 may not include the network interface 135.

The tuner unit 110 selects a Radio Frequency (RF) broadcast signal corresponding to a channel selected by a user or an RF broadcast signal corresponding to each of pre-stored channels from among a plurality of RF broadcast signals received through an antenna (not shown), and down-converts the selected RF broadcast signal into an Intermediate Frequency (IF) signal or a baseband Audio/Video (A/V) signal.

For example, if the selected RF broadcast signal is a digital broadcast signal, the tuner unit 110 downconverts the selected RF broadcast signal into a digital IF signal. On the other hand, if the selected RF broadcast signal is an analog broadcast signal, the tuner unit 110 downconverts the selected RF broadcast signal into an analog baseband A/V signal, CVBS/SIF. That is, the tuner unit 110 may process a digital broadcast signal or an analog broadcast signal. The analog baseband A/V signal, CVBS/SIF from the tuner unit 110 may be provided directly to the controller 170.

The tuner unit 110 may sequentially select a number of RF broadcast signals corresponding to all broadcast channels previously stored in the image display apparatus 100 by a channel add function from among a plurality of RF signals received through the antenna, and may downconvert the selected RF broadcast signals into IF signals or baseband A/V signals.

The tuner unit 110 may include a plurality of tuners for receiving broadcast signals of a plurality of channels, or a single tuner for simultaneously receiving broadcast signals of a plurality of channels.

The demodulator 120 receives the digital IF signal from the tuner unit 110 and demodulates the digital IF signal.

The demodulator 120 may perform demodulation and channel decoding on the digital IF signal, thereby obtaining a stream signal TS. The stream signal TS may be a signal in which a video signal, an audio signal and/or a data signal are multiplexed.

The stream signal may be input to the controller 170 and then subjected to demultiplexing and A/V signal processing.

The controller 170 outputs the processed video and audio signals to the display 180 and the audio output unit 185, respectively.

The external device interface 130 may transmit and receive data to and from a connected external device (not shown) such as a set-top box. For this purpose, the external device interface 130 may include an A/V Input/Output (I/O) unit (not shown).

The external device interface 130 may be connected to an external device, wirelessly or wiredly, such as a Digital Versatile Disk (DVD) player, a Blu-ray Disk (BD) player, a game console, a camera, a camcorder, a computer (e.g. a laptop computer), or a set-top box. Then, the external device interface 130 may transmit and receive signals to and from the external device.

The A/V I/O unit may receive audio and video signals from an external device, and a wireless communication unit (not shown) may conduct short-range wireless communication with another electronic device.

The external device interface 130 may exchange data with the nearby mobile terminal 600 through the wireless communication unit (not shown). Particularly, the external device interface 130 may receive device information, executed application information, an application image, and so on from the mobile terminal 600 in a mirroring mode.

The network interface 135 serves as an interface between the image display apparatus 100 and a wired/wireless network such as the Internet. For example, the network interface 135 may receive content or data from the Internet or from a Content Provider (CP) or a Network Provider (NP) over a network.

The network interface 135 may include a wireless communication unit (not shown).

The memory 140 may store programs necessary for the controller 170 to process signals and control, and may also store a processed audio, video, or data signal.

The memory 140 may also temporarily store an audio, video or data signal received from the external device interface 130. The memory 140 may store information about broadcast channels by the channel-add function.

While the memory 140 is shown in FIG. 2 as configured separately from the controller 170, to which the present disclosure is not limited, the memory 140 may be incorporated into the controller 170.

The user input interface 150 transmits a signal received from the user to the controller 170 or transmits a signal received from the controller 170 to the user.

For example, the user input interface 150 may receive user input signals such as a power-on/off signal, a channel selection signal, and a screen setting signal from the remote controller 200, provide the controller 170 with user input signals received from local keys (not shown), such as inputs of a power key, a channel key, a volume key, and a setting value, transmit a user input signal received from the sensor unit (not shown) that senses a user gesture to the controller 170, or transmit a signal received from the controller 170 to the sensor unit (not shown).

The controller 170 may demultiplex a stream signal received from the tuner unit 110, the demodulator 120, the network interface 135, or the external device interface 130 into a number of signals, and process the demultiplexed signals into audio and video signals.

The video signal processed by the controller 170 may be displayed as an image corresponding to the video signal on the display 180. The video signal processed by the controller 170 may also be transmitted to an external output device through the external device interface 130.

The audio signal processed by the controller 170 may be output to the audio output unit 185. Also, the audio signal processed by the controller 170 may be transmitted to an external output device through the external device interface 130.

While not shown in FIG. 2, the controller 170 may include a Demultiplexer (DEMUX) and a video processor, which will be described later with reference to FIG. 3.

In addition, the controller 170 may provide overall control to the image display apparatus 100. For example, the controller 170 may control the tuner unit 110 to select an RF broadcast signal corresponding to a user-selected channel or a pre-stored channel.

The controller 170 may control the image display apparatus 100 according to a user command received through the user input interface 150 or according to an internal program.

The controller 170 may control the display 180 to display an image. The image displayed on the display 180 may be a Two-Dimensional (2D) or Three-Dimensional (3D) still image or video.

The controller 170 may control a particular 2D object in the image displayed on the display 180. For example, the particular 2D object may be at least one of a linked Web page (e.g. from a newspaper or a magazine), an Electronic Program Guide (EPG), a menu, a widget, an icon, a still image, a video, or text.

The controller 170 may locate the user based on an image captured by a camera unit (not shown). For example, the controller 170 may determine the distance (a z-axis coordinate) between the user and the image display apparatus 100. In addition, the controller 170 may determine x-axis and y-axis coordinates corresponding to the position of the user on the display 180.

The display 180 generates drive signals by converting a processed video signal, a processed data signal, an On Screen Display (OSD) signal, and a control signal received from the controller 170 or a video signal, a data signal, and a control signal received from the external device interface 130.

The display 180 may be various types of displays such as a Plasma Display Panel (PDP), a Liquid Crystal Display (LCD), an Organic Light-Emitting Diode (OLED) display, and a flexible display. The display 180 may also be a 3D display. The 3D display 180 may be classified into a glasses-free type and a glasses type.

The display 180 may also be a touch screen that can be used not only as an output device but also as an input device.

The audio output unit 185 may receive a processed audio signal from the controller 170 and output the received audio signal as voice.

The camera unit (not shown) captures a user. The camera unit may include, but not limited to, a single camera. When needed, the camera unit may include a plurality of cameras. The camera unit may be embedded on the display 180 in the image display apparatus 100, or may be separately configured. Image information captured by the camera unit may be provided to the controller 170.

The controller 170 may sense a user's gesture from a captured image received from the camera unit or from signals received from the sensor unit (not shown) alone or in combination.

The power supply 190 supplies power across the whole image display apparatus 100. Particularly, the power supply 190 may supply power to the controller 170 which may be implemented as a System On Chip (SOC), the display 180 for displaying an image, the audio output unit 185 for outputting an audio signal, and so on.

Specifically, the power supply 190 may include a converter for converting Alternating Current (AC) power to Direct Current (DC) power, and a DC/DC converter for converting the level of DC power.

The remote controller 200 transmits a user input to the user input interface 150. For the transmission of a user input, the remote controller 200 may operate based on various communication standards such as Bluetooth, RF communication, IR communication, Ultra WideBand (UWB), and ZigBee. In addition, the remote controller 200 may receive a video signal, an audio signal and/or a data signal from the user input interface 150 and may output the received signal as an image or sound.

The above-described image display apparatus 100 may be a fixed or mobile digital broadcast receiver.

The block diagram of the image display apparatus 100 illustrated in FIG. 2 is an exemplary embodiment of the present disclosure. The image display apparatus 100 is shown in FIG. 15 as having a number of components in a given configuration. However, the image display apparatus 100 may include fewer components or more components than those shown in FIG. 15. Also, two or more components of the image display apparatus 100 may be combined into a single component or a single component thereof may be separated into two more components. The functions of the components of the image display apparatus 100 as set forth herein are illustrative in nature and may be modified, for example, to meet the requirements of a given application.

Figure 3:
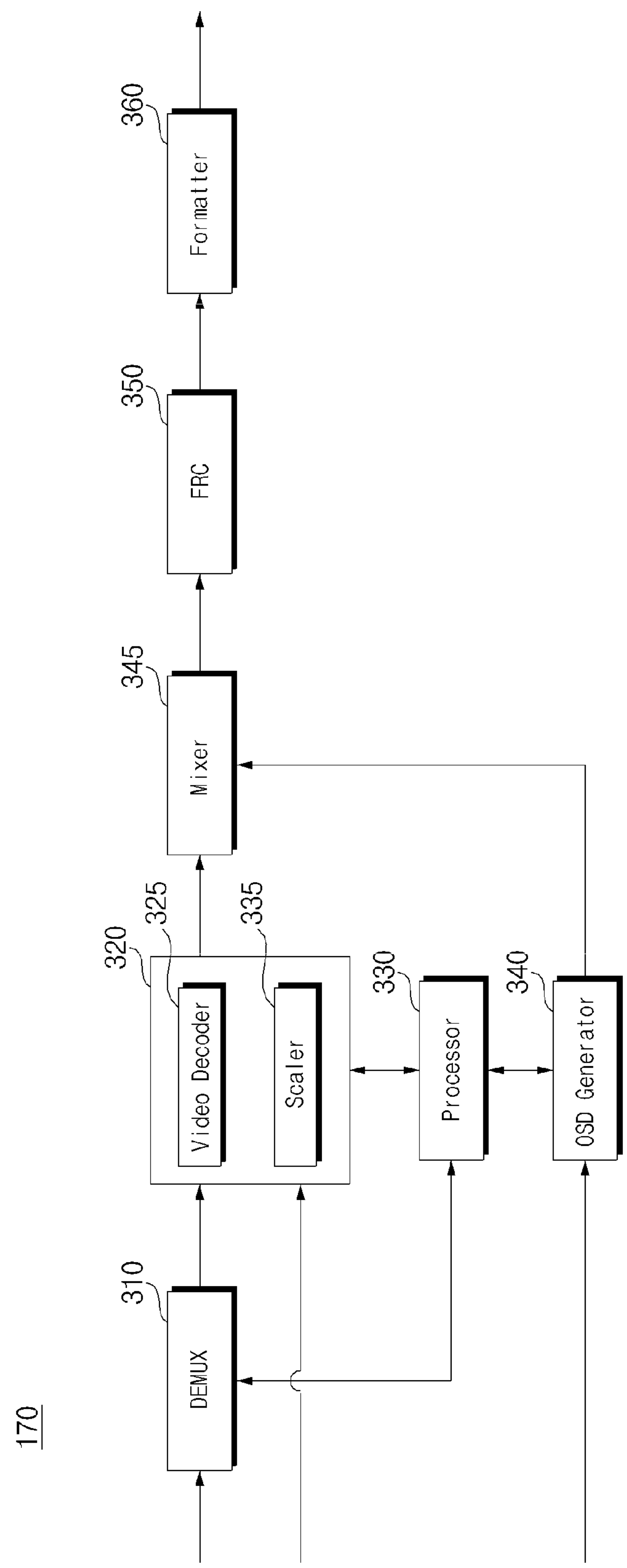
FIG. 3 is a block diagram illustrating a controller illustrated in FIG. 2.

FIG. 3 is a block diagram of the controller illustrated in FIG. 2.

Referring to FIG. 3, the controller 170 may include a DEMUX 310, a video processor 320, a processor 330, an OSD generator 340, a mixer 345, a Frame Rate Converter (FRC) 350, and a formatter 360 according to an embodiment of the present invention. The controller 170 may further include an audio processor (not shown) and a data processor (not shown).

The DEMUX 310 demultiplexes an input stream. For example, the DEMUX 310 may demultiplex an MPEG-2 TS into a video signal, an audio signal, and a data signal. The input stream signal may be received from the tuner unit 110, the demodulator 120, or the external device interface 130.

The video processor 320 may process the demultiplexed video signal. For video signal processing, the video processor 320 may include a video decoder 325 and a scaler 335.

The video decoder 325 decodes the demultiplexed video signal and the scaler 335 scales the resolution of the decoded video signal so that the video signal may be displayed on the display 180.

The video decoder 325 may be provided with decoders that operate in conformance to various standards. For example, the video decoder 325 may include, for example, an MPEG-2 decode, an H.264 decode, a 3D video decoder for a color image a depth image, a decoder for multi-view images, and so on.

The processor 330 may provide overall control to the image display apparatus 100 or the controller 170. For example, the processor 330 may control the tuner unit 110 to tune to an RF broadcasting corresponding to a user-selected channel or a pre-stored channel.

The processor 330 may also control the image display apparatus 100 according to a user command received through the user input interface 150 or an internal program. The processor 330 may control data transmission through the network interface 135 or the external device interface 130.

The processor 330 may control operations of the DEMUX 310, the video processor 320, and the OSD generator 340 in the controller 170.

The OSD generator 340 generates an OSD signal autonomously or according to a user input. For example, the OSD generator 340 may generate signals by which a variety of information is displayed as graphics or text on the display 180, according to user input signals. The OSD signal may include various data such as a User Interface (UI), a variety of menus, widgets, and icons. The generated OSD signal may include a 2D or 3D object.

Further, the OSD generator 340 may generate a pointer to be displayed on the display 180 based on a pointing signal received from the remote controller 200. Especially, the pointer may be generated from a pointing signal processor (not shown), which may reside in the OSD generator 340. Obviously, the pointing signal processor may be configured separately from the OSD generator 240.

The mixer 345 may mix the decoded video signal processed by the video processor 320 with the OSD signal generated from the OSD generator 340. The mixed video signal is provided to the FRC 350.

The FRC 350 may change the frame rate of the input video signal or simply output the video signal without frame rate conversion.

The formatter 360 may arrange left-eye and right-eye video frames of the frame rate-converted 3D image and may also output a synchronization signal Vsync to open the left or right lens of a 3D viewing device (not shown).

The formatter 360 may change the format of an input video signal to a video signal to be displayed on the display.

The formatter 360 may change the format of a 3D video signal to one of various 3D formats such as a side by side format, a top/down format, a frame sequential format, an interlaced format, and a checker format.

Meanwhile, the formatter 360 may convert a 2D video signal to a 3D video signal. For example, the formatter 360 may detect edges or a selectable object from the 2D video signal and generate a 3D video signal with an object based on the detected edges or the selectable object by a 3D image generation algorithm. Herein, the 3D video signal may be separated into left-eye and right-eye image signals L and R.

A 3D processor (not shown) may further be provided at the rear end of the formatter 360, for processing a signal to exert 3D effects. For enhancing 3D effects, the 3D processor may adjust the brightness, tint, and color of a video signal. For example, the 3D processor may process a video signal so that a near area appears clear and a far area appears obscure. Meanwhile, the function of the 3D processor may be incorporated into the formatter 360 or the video processor 320.

The audio processor (not shown) of the controller 170 may process the demultiplexed audio signal. For the audio signal processing, the audio processor may have a plurality of decoders.

The audio processor (not shown) of the controller 170 may also adjust the bass, treble, and volume of the audio signal.

The data processor (not shown) of the controller 170 may process the data signal obtained by demultiplexing the input stream signal. For example, if the demultiplexed data signal is a coded data signal, the data processor may decode the coded data signal. The coded data signal may be an EPG which includes broadcasting information specifying the start time, end time, and the like of a scheduled broadcast program of each channel.

The block diagram of the controller 170 illustrated in FIG. 3 is purely exemplary. Depending upon the specifications of the controller 170 in actual implementation, the components of the controller 170 may be combined or omitted or new components may be added.

Especially, the FRC 350 and the formatter 360 may be configured as separate modules or as a single module, outside the controller 170.

Figure 4A:
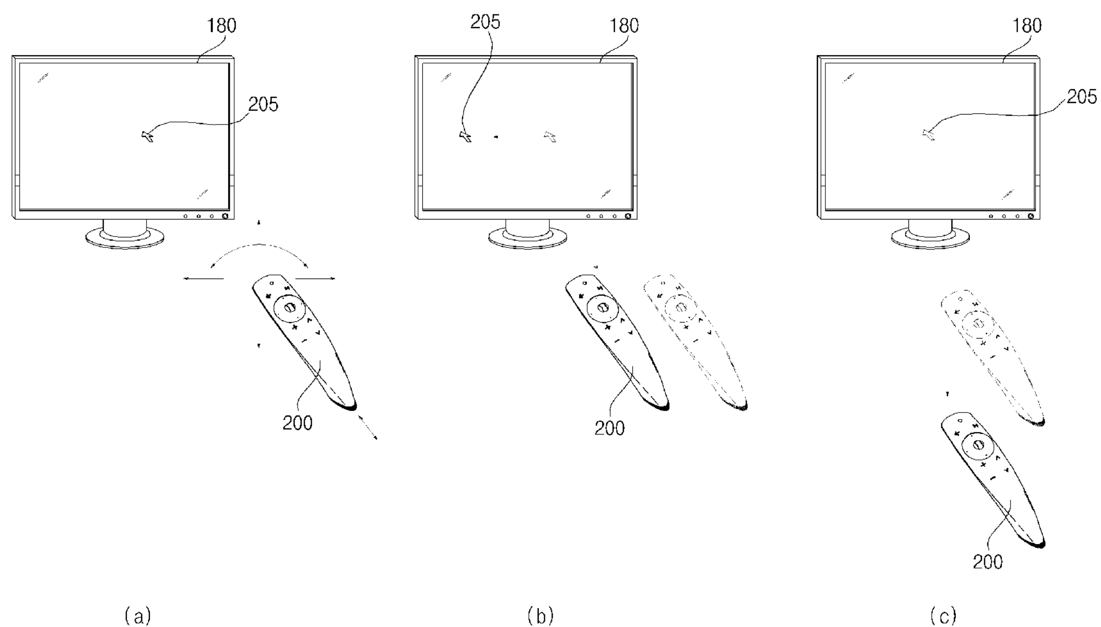
FIG. 4A is a view illustrating a method for controlling a remote controller illustrated in FIG. 2.

FIG. 4A illustrates a method for controlling the remote controller illustrated in FIG. 2.

(a) of FIG. 4A illustrates a pointer 205 representing movement of the remote controller 200, displayed on the display 180.

The user may move or rotate the remote controller 200 up and down, side to side ((b) of FIG. 4A), and back and forth ((c) of FIG. 4A). The pointer 205 displayed on the display 180 corresponds to movement of the remote controller 200. Since the pointer 205 moves in accordance with the movement of the remote controller 200 in a 3D space, the remote controller 200 may be referred to as a spatial remote controller or a 3D pointing device.

Referring to (b) of FIG. 4A, if the user moves the remote controller 200 to the left, the pointer 205 moves to the left on the display 180.

A sensor of the remote controller 200 detects the movement of the remote controller 200 and transmits motion information corresponding to the result of the detection to the image display apparatus. Then, the image display apparatus may determine the movement of the remote controller 200 based on the motion information received from the remote controller 200, and calculate the coordinates of a target point to which the pointer 205 should be shifted in accordance with the movement of the remote controller 200 based on the result of the determination. The image display apparatus then displays the pointer 205 at the calculated coordinates.

Referring to (c) of FIG. 4A, while pressing a predetermined button of the remote controller 200, the user moves the remote controller 200 away from the display 180. Then, a selected area corresponding to the pointer 205 may be zoomed in and enlarged on the display 180. On the contrary, if the user moves the remote controller 200 toward the display 180, the selection area corresponding to the pointer 205 is zoomed out and thus contracted on the display 180. On the other hand, when the remote controller 200 moves away from the display 180, the selection area may be zoomed out and when the remote controller 200 approaches the display 180, the selection area may be zoomed in.

With the predetermined button pressed in the remote controller 200, the up, down, left and right movements of the remote controller 200 may be ignored. That is, when the remote controller 200 moves away from or approaches the display 180, only the back and forth movements of the remote controller 200 are sensed, while the up, down, left and right movements of the remote controller 200 are ignored. Unless the predetermined button is pressed in the remote controller 200, the pointer 205 moves in accordance with the up, down, left or right movement of the remote controller 200.

The speed and direction of the pointer 205 may correspond to the speed and direction of the remote controller 200.

Figure 4B:
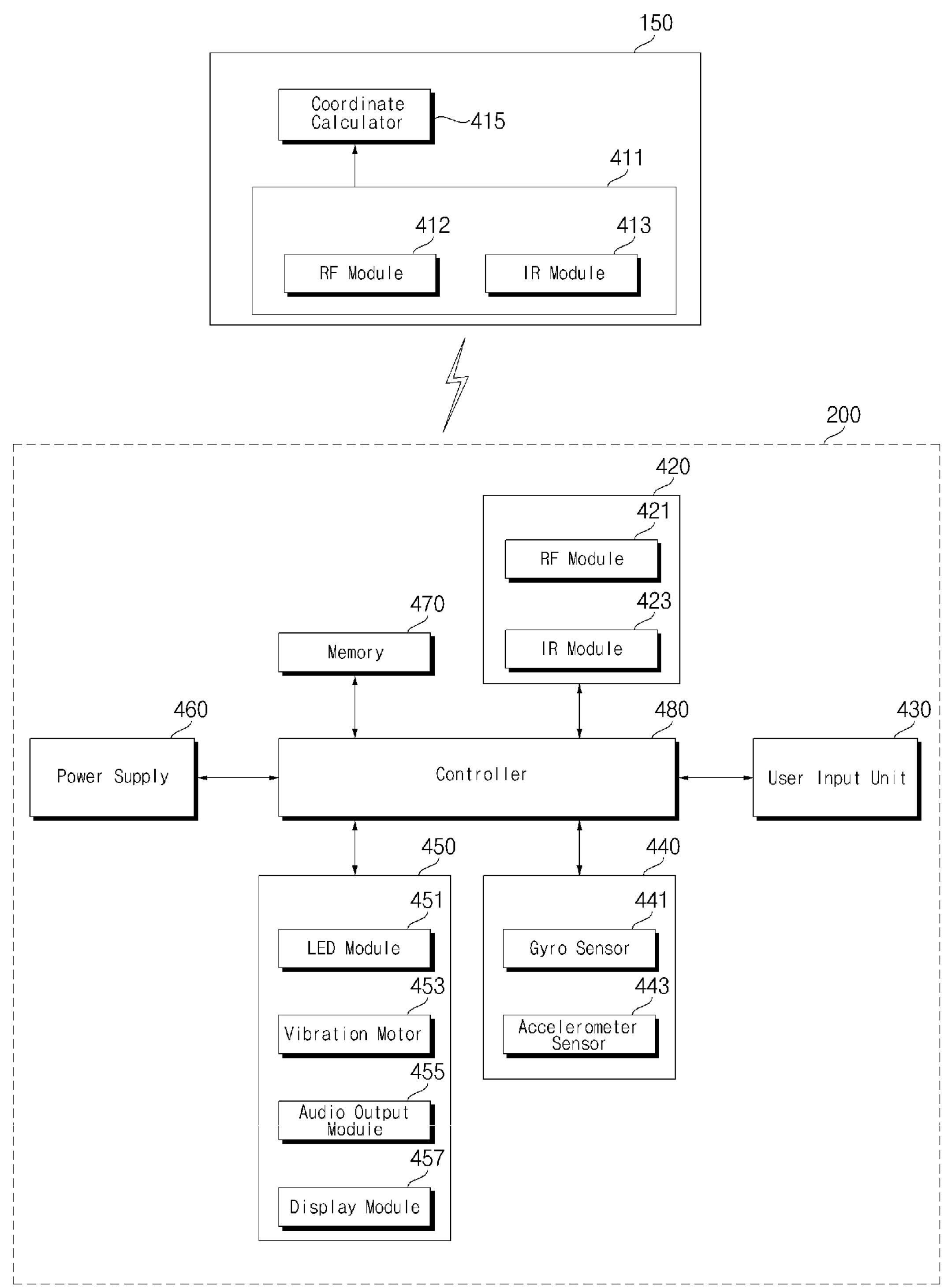
FIG. 4B is a block diagram illustrating the remote controller illustrated in FIG. 2.

FIG. 4B is a block diagram of the remote controller illustrated in FIG. 2.

Referring to FIG. 4B, the remote controller 200 may include a wireless communication module 420, a user input unit 430, a sensor unit 440, an output unit 450, a power supply 460, a memory 470, and a controller 480.

The wireless communication module 420 transmits signals to and/or receives signals from one of image display apparatuses according to embodiments of the present disclosure. One of the image display apparatuses according to embodiments of the present disclosure, that is, the image display apparatus 100 will be taken as an example.

In this embodiment, the remote controller 200 may include an RF module 421 for transmitting RF signals to and/or receiving RF signals from the image display apparatus 100 according to an RF communication standard. Further, the remote controller 200 may include an IR module 423 for transmitting IR signals to and/or receiving IR signals from the image display apparatus 100 according to an IR communication standard.

In this embodiment, the remote controller 200 may transmit a signal carrying information about movement of the remote controller 200 to the image display apparatus 100 through the RF module 421.

Further, the remote controller 200 may receive signals from the image display apparatus 100 through the RF module 421. The remote controller 200 may transmit commands, such as a power on/off command, a channel switching command, or a sound volume change command, to the image display apparatus 100 through the IR module 423, as needed.

The user input unit 430 may include a keypad, a plurality of buttons, a touch pad, or a touch screen. The user may enter commands to the image display apparatus 100 by manipulating the user input unit 430. If the user input unit 430 includes a plurality of hard-key buttons, the user may input various commands to the image display apparatus 100 by pressing the hard-key buttons. If the user input unit 430 includes a touch screen displaying a plurality of soft keys, the user may input various commands to the image display apparatus 100 by touching the soft keys. The user input unit 430 may also include various input tools other than those set forth herein, such as a scroll key and/or a jog key, which should not be construed as limiting the present disclosure.

The sensor unit 440 may include a gyro sensor 441 and/or an acceleration sensor 443. The gyro sensor 441 may sense the movement of the remote controller 200.

For example, the gyro sensor 441 may sense motion information about the remote controller 200 in X-, Y-, and Z-axis directions. The acceleration sensor 443 may sense the moving speed of the remote controller 200. The sensor unit 440 may further include a distance sensor for sensing the distance between the remote controller 200 and the display 180.

The output unit 450 may output a video and/or audio signal corresponding to a manipulation of the user input unit 430 or a signal transmitted by the image display apparatus 100. The user may easily identify whether the user input unit 430 has been manipulated or whether the image display apparatus 100 has been controlled based on the video and/or audio signal output from the output unit 450.

For example, the output unit 450 may include an LED module 451 which is turned on or off whenever the user input unit 430 is manipulated or whenever a signal is received from or transmitted to the image display apparatus 100 through the wireless communication module 420, a vibration module 453 which generates vibrations, an audio output module 455 which outputs audio data, or a display module 457 which outputs an image.

The power supply 460 supplies power to the remote controller 200. If the remote controller 200 is kept stationary for a predetermined time or longer, the power supply 460 may, for example, cut off supply of power to the remote controller 200 in order to save power. The power supply 460 may resume supply of power if a specific key on the remote controller 200 is manipulated.

The memory 470 may store various programs and application data for controlling or operating the remote controller 200. The remote controller 200 may wirelessly transmit signals to and/or receive signals from the image display apparatus 100 in a predetermined frequency band through the RF module 421. The controller 480 of the remote controller 200 may store information regarding the frequency band used for the remote controller 200 to wirelessly transmit signals to and/or wirelessly receive signals from the paired image display apparatus 100 in the memory 470 and may then refer to this information for use at a later time.

The controller 480 provides overall control to the remote controller 200. For example, the controller 480 may transmit a signal corresponding to a key manipulation detected from the user input unit 430 or a signal corresponding to motion of the remote controller 200, as sensed by the sensor unit 440, to the image display apparatus 100 through the wireless communication module 420.

The user input interface 150 of the image display apparatus 100 may include a wireless communication module 411 which wirelessly transmits signals to and/or wirelessly receives signals from the remote controller 200, and a coordinate calculator 415 which calculates coordinates representing the position of the remote controller 200 on the display screen, which is to be moved in accordance with the movement of the remote controller 200.

The user input interface 150 may wirelessly transmit RF signals to and/or wirelessly receive RF signals from the remote controller 200 through an RF module 412. In addition, the user input interface 150 may wirelessly receive IR signals from the remote controller 200 through an IR module 413 according to the IR communication standard.

The coordinate calculator 415 may receive motion information regarding the movement of the remote controller 200 through the wireless communication module 411 and may calculate coordinates (x, y) representing the position of the pointer 205 on a screen of the display 180 by correcting the motion information for possible errors or user hand tremor.

A signal received in the image display apparatus 100 from the remote controller 200 through the user input interface 150 may be transmitted to the controller 170. Then, the controller 170 may acquire information regarding the movement of the remote controller 200 and information regarding a key manipulation detected from the remote controller 200 from the signal received from the remote controller 200, and may control the image display apparatus 100 based on the acquired information.

In another example, the remote controller 200 may calculate the coordinates of a position to which the pointer is to be shifted in correspondence with its movement and output the coordinates to the user input interface 150 of the image display apparatus 100. In this case, the user input interface 150 may transmit information about the pointer coordinates which was not corrected for possible errors or user hand tremor to the controller 170.

In a further example, unlike the configuration of the remote controller 200 illustrated in FIG. 17B, the coordinate calculator 415 may reside in the controller 170, instead of the user input interface 150.

Figure 5:
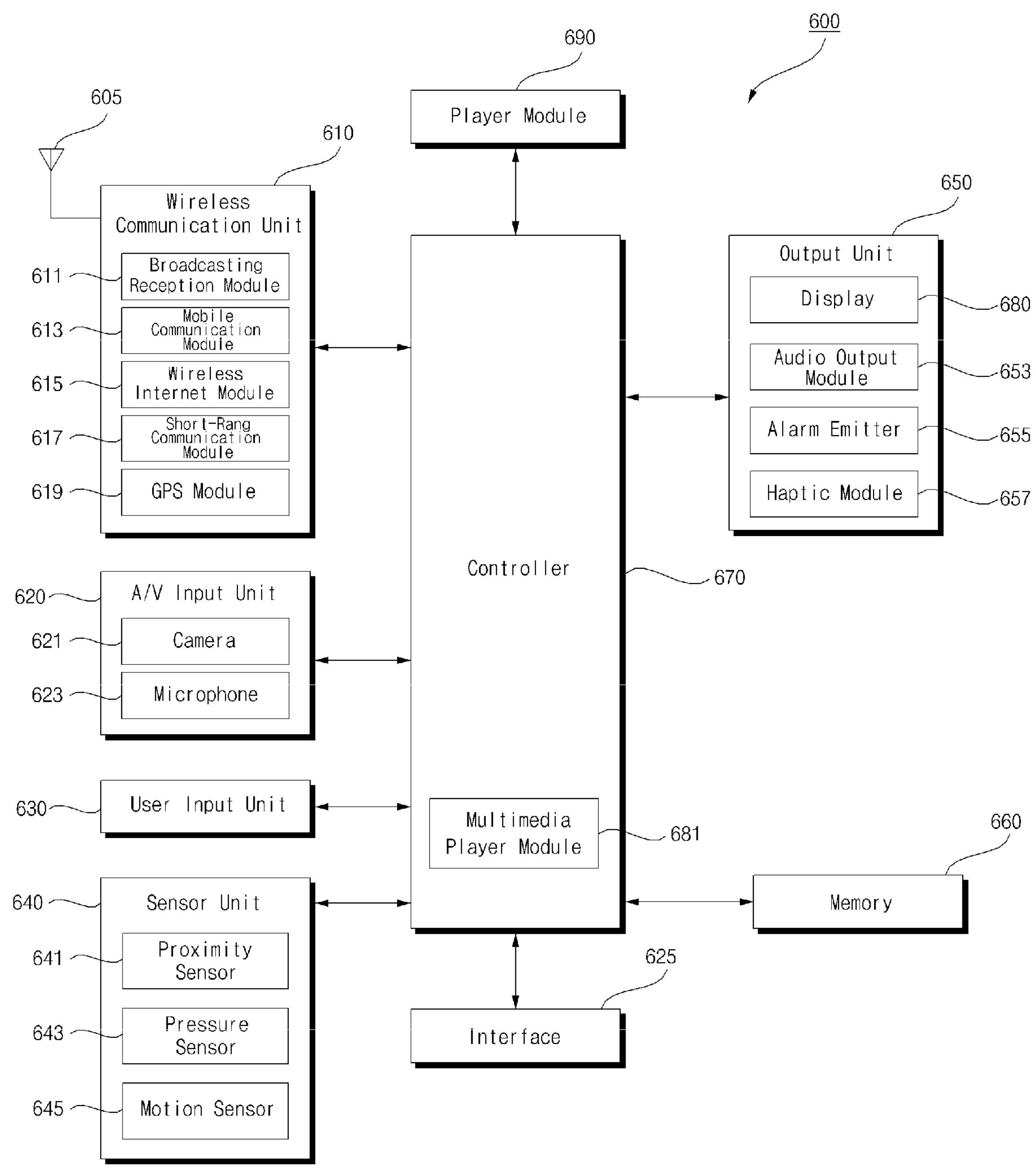
FIG. 5 is a block diagram of a mobile terminal illustrated in FIG. 1.

FIG. 5 is a block diagram of the mobile terminal illustrated in FIG. 1.

Referring to FIG. 5, a mobile terminal 600 may include a wireless communication unit 610, an A/V input unit 620, a user input unit 630, a sensor unit 640, an output unit 650, a memory 660, an interface 625, a controller 670, and a power supply 690.

The wireless communication unit 610 may include a broadcasting reception module 611, a mobile communication module 613, a wireless Internet module 615, an audio communication unit 617, and a Global Positioning System (GPS) module 619.

The broadcasting reception module 611 receives at least one of a broadcast signal or broadcasting-related information on a broadcast channel from an external broadcasting management server. The broadcast channel may be any of a satellite channel, a terrestrial channel, and so on.

The broadcast signal and/or broadcasting-related information received at the broadcasting reception module 611 may be stored in the memory 660.

The mobile communication module 613 transmits a radio signal to and receives a radio signal from at least one of a Base Station (BS), an external terminal, or a server over a mobile communication network. The radio signal may include a voice call signal, a video call signal, or text/other various types of data involved in multimedia message transmission and reception.

The wireless Internet module 615 is a built-in or external module for providing wireless Internet connectivity to the mobile terminal 600. The wireless Internet module 615 may operate in conformance to Wireless Fidelity (WiFi) or WiFi Direct.

The audio communication unit 617 is used for audio communication. The audio communication unit 617 may output a sound by adding predetermined information data to audio data to be output in an audio communication mode. Further, the audio communication unit 617 may extract predetermined information data from a sound received from the outside in the audio communication mode.

Besides, for short-range communication, Bluetooth, Radio Frequency Identification (RFID), Infrared Data Association (IrDA), Ultra WideBand (UWB), ZigBee, and so on may be used.

The GPS module 619 receives location information from a plurality of GPS satellites.

The A/V input unit 620 is used to receive an audio signal or a video signal and may include a camera 621 and a microphone 623.

The user input unit 630 generates key input data that the user inputs to control the operation of the mobile terminal 600. For this purpose, the user input unit 630 may include a keypad, a dome switch, a (resistive/capacitive) touch pad, and so on. Especially when a touch pad is layered with a display 680, the resulting structure may be referred to as a touch screen.

The sensor unit 640 senses the current state of the mobile terminal 600, such as the open or closed state, position, or user touch of the mobile terminal 600 and generates a sensing signal to control the operation of the mobile terminal 600 according to the sensed state.

The sensor unit 640 may include a proximity sensor 641, pressure sensor 643, and a motion sensor 645. The motion sensor 645 senses the position or motion of the mobile terminal 600 using an accelerometer sensor, a gyro sensor, a gravity sensor, or the like. Particularly, the gyro sensor measures an angular velocity and thus senses a rotated direction with respect to a reference direction.

The output unit 650 may include the display 680, an audio output module 653, an alarm emitter 655, and a haptic module 657.

The display 680 displays information processed in the mobile terminal 600.

As described before, if a touch screen is configured by layering the display 680 with a touch pad, the display 680 may be used not only as an output device but also as an input device capable of receiving information by a user's touch.

The audio output unit 653 outputs audio data received from the wireless communication unit 610 or stored in the memory 660. The audio output unit 653 may include a speaker, a buzzer, and the like.

The alarm emitter 655 outputs a signal notifying occurrence of an event to the mobile terminal 600. For example, the event notification signal may be output in the form of vibrations.

The haptic module 657 generates various tactile effects that a user can feel. A major example of the tactile effects is vibrations.

The memory 660 may store programs required for processing and controlling in the controller 670 or temporarily store input or output data (e.g. a phone book, messages, still images, videos, etc.).

The interface 625 interfaces between the mobile terminal 600 and all external devices connected to the mobile terminal 600. The interface 625 may receive data or power from such an external device and transfer the data or power to each component of the mobile terminal 600. In addition, the interface 625 may transmit data from the mobile terminal 600 to the external device.

The controller 670 typically provides overall control to the mobile terminal 600 by controlling the operation of each component. For example, the controller 670 controls and processes voice call, data communication, video call, and so on. The controller 670 may include a multimedia player module 681 for playing multimedia. The multimedia player module 681 may be configured in hardware inside the controller 670 or in software separately from the controller 670.

The power supply 690 may receive power from an external power source or an internal power source and supply power to the other components of the mobile terminal 600 under the control of the controller 670.

The block diagram of the mobile terminal 600 illustrated in FIG. 5 is purely exemplary. Depending upon the specifications of the mobile terminal 600 in actual implementation, the components of the mobile terminal 600 may be combined or omitted or new components may be added. That is, when needed, two or more components may be incorporated into a single component, or one component may be separated into two or more components. Further, the function of each block is presented to describe embodiments of the present disclosure, and its specific operation or device does not limit the scope and spirit of the present disclosure.

Figure 6:
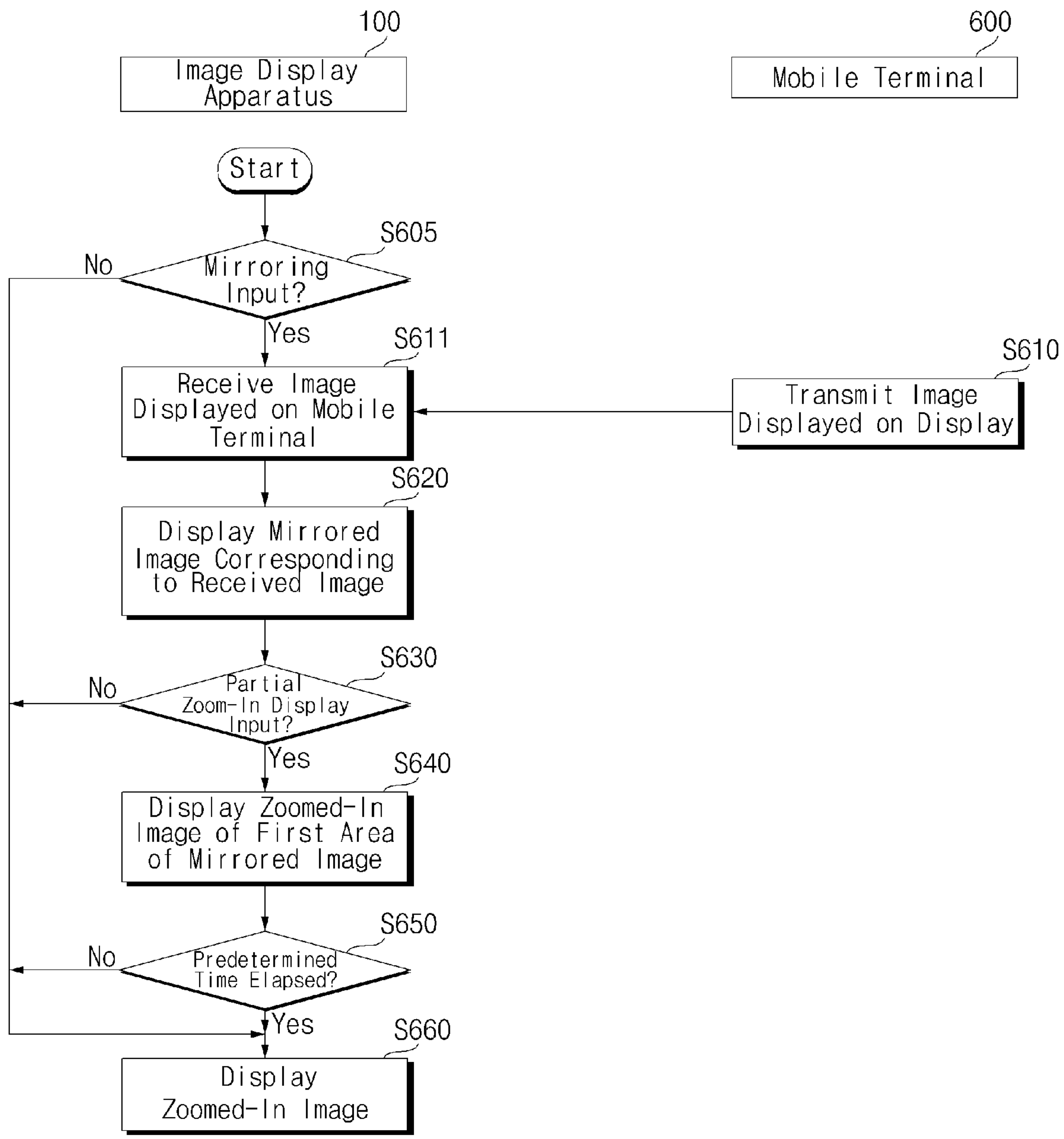
FIG. 6 is a flowchart illustrating an exemplary method for operating an image display apparatus and a mobile terminal according to an embodiment of the present disclosure.

FIG. 6 is a flowchart illustrating an exemplary method for operating an image display apparatus and a mobile terminal according to an embodiment of the present disclosure, and FIGS. 7A to 14I are views referred to for describing the operation method illustrated in FIG. 6.

Referring to FIG. 6, the controller 170 of the image display apparatus 100 determines whether a mirroring input has been received (S605).

Figure 7A:
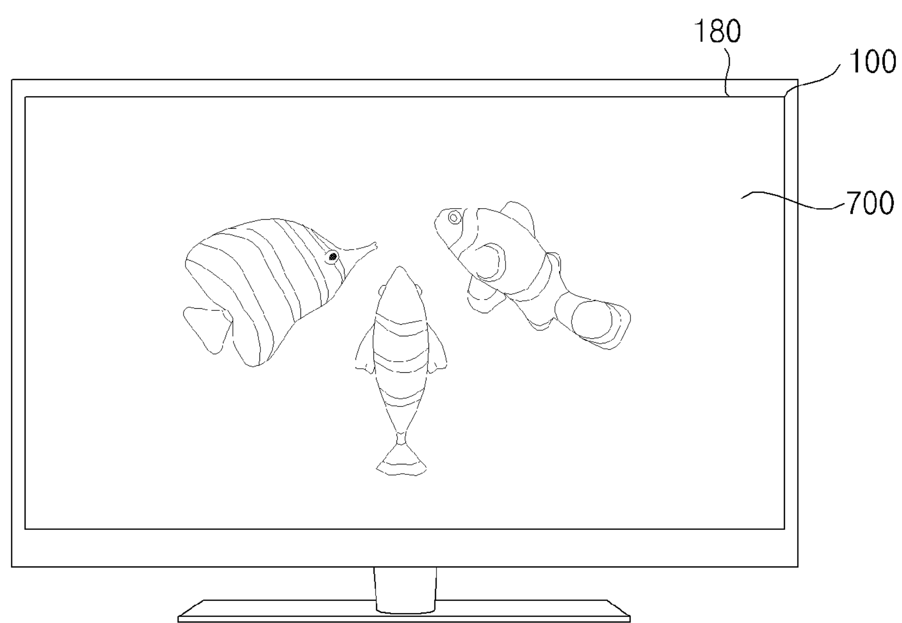
FIGS. 7A to 14I are views referred to for describing the operation method illustrated in FIG. 6.
Figure 7B:
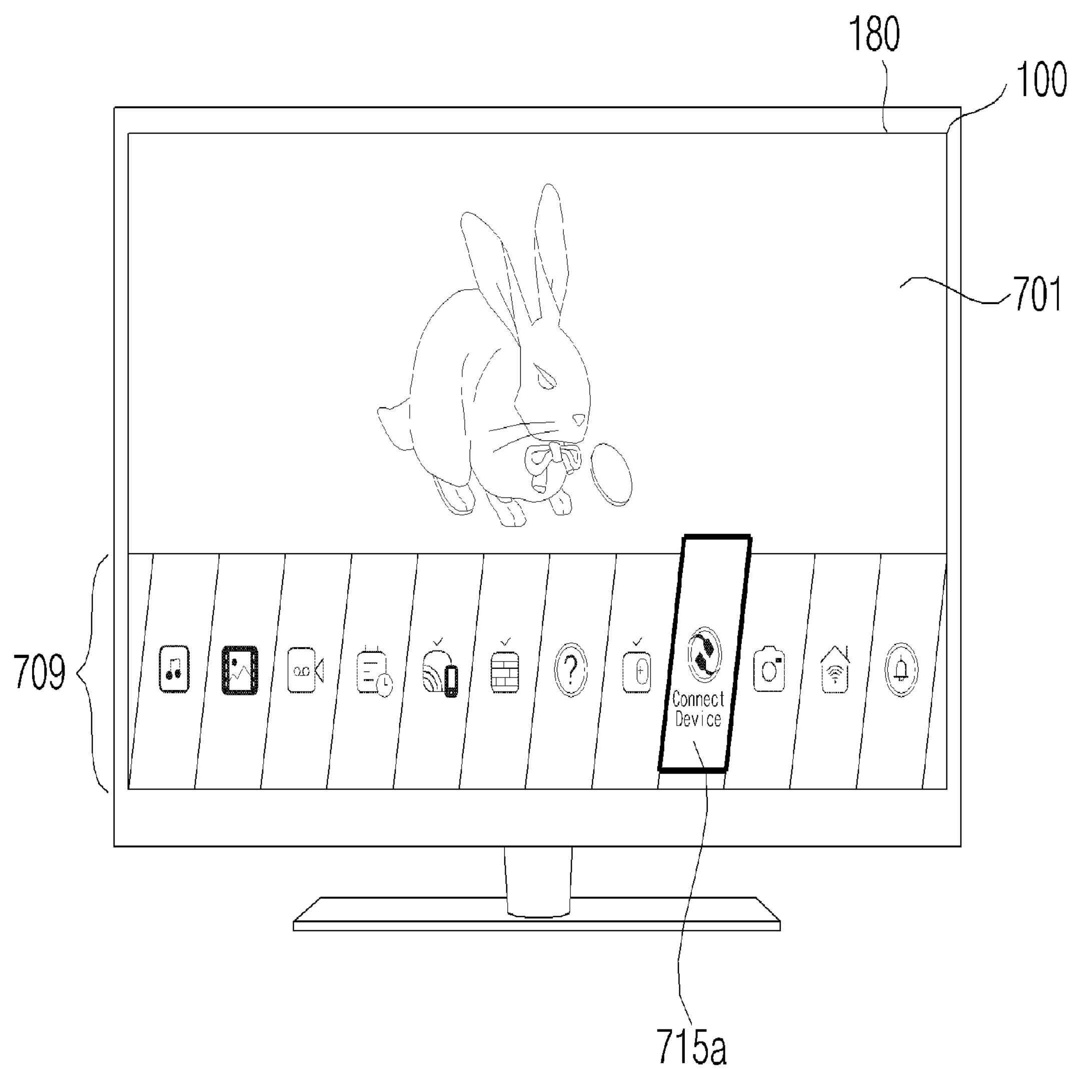

Upon receipt of a menu input with a specific image 700 such as a broadcast image displayed as illustrated in FIG. 7A, the controller 170 of the image display apparatus 100 may control to display an application list 709 including a plurality of application items on a part of the display 180, as illustrated in FIG. 7B.

The application list 709 may include the plurality of application items, and is shown in FIG. 7B as including a mirroring application item 715*a*.

Upon selection of the mirroring application item 715*a* by the remote controller 200, the controller 170 of the image display apparatus 100 may control execution of mirroring with the preset mobile terminal 600.

For example, upon selection of the mirroring application item 715*a* in the image display apparatus 100, the image display apparatus 100 may transmit a pairing request signal to the mobile terminal 600, and the mobile terminal 600 may reply to the image display apparatus 100 with a pairing response signal. The image display apparatus 100 may complete pairing with the mobile terminal based on the pairing response signal, thereby establishing a wireless connection with the mobile terminal 600.

In another example, upon selection of a mirroring application in the mobile terminal 600, the mobile terminal 600 may transmit a pairing request signal to the mobile terminal 600, and the image display apparatus 100 may reply to the mobile terminal 600 with a pairing response signal. The mobile terminal 600 may complete pairing with the image display apparatus 100 based on the pairing response signal, thereby establishing a wireless connection with the image display apparatus 100.

As the image display apparatus 100 has been wirelessly connected to the mobile terminal 600, the controller 170 of the image display apparatus 100 may determine that the mirroring input has been received.

Alternatively or additionally, upon selection of the mirroring application item 705*a*, the controller 170 of the image display apparatus 100 may determine that the mirroring input has been received.

Subsequently, in response to the mirroring input, the mobile terminal 600 may transmit, as a mirrored image, an image displayed on the display 680 of the mobile terminal 600 to the image display apparatus 100 (S610).

Therefore, the controller 170 of the image display apparatus 100 may receive the mirrored image through the interface 135 (S611), and may control to display the received mirrored image on the display 180 (S620).

Meanwhile, the mobile terminal 600 may transmit additional black images added to the left and right sides of the image 710 displayed on the display 680 of the mobile terminal 600 according to the resolution or aspect ratio of the image display apparatus 100.

Thus, the controller 170 of the image display apparatus 100 may receive the additional black images added to the left and right sides of the image 710 along with the image 710 displayed on the display 680 of the mobile terminal 600, and control to display the additional black images and the mirrored image 720 in areas Ara, Arb, and Arc of the display 180.

Figure 7C:
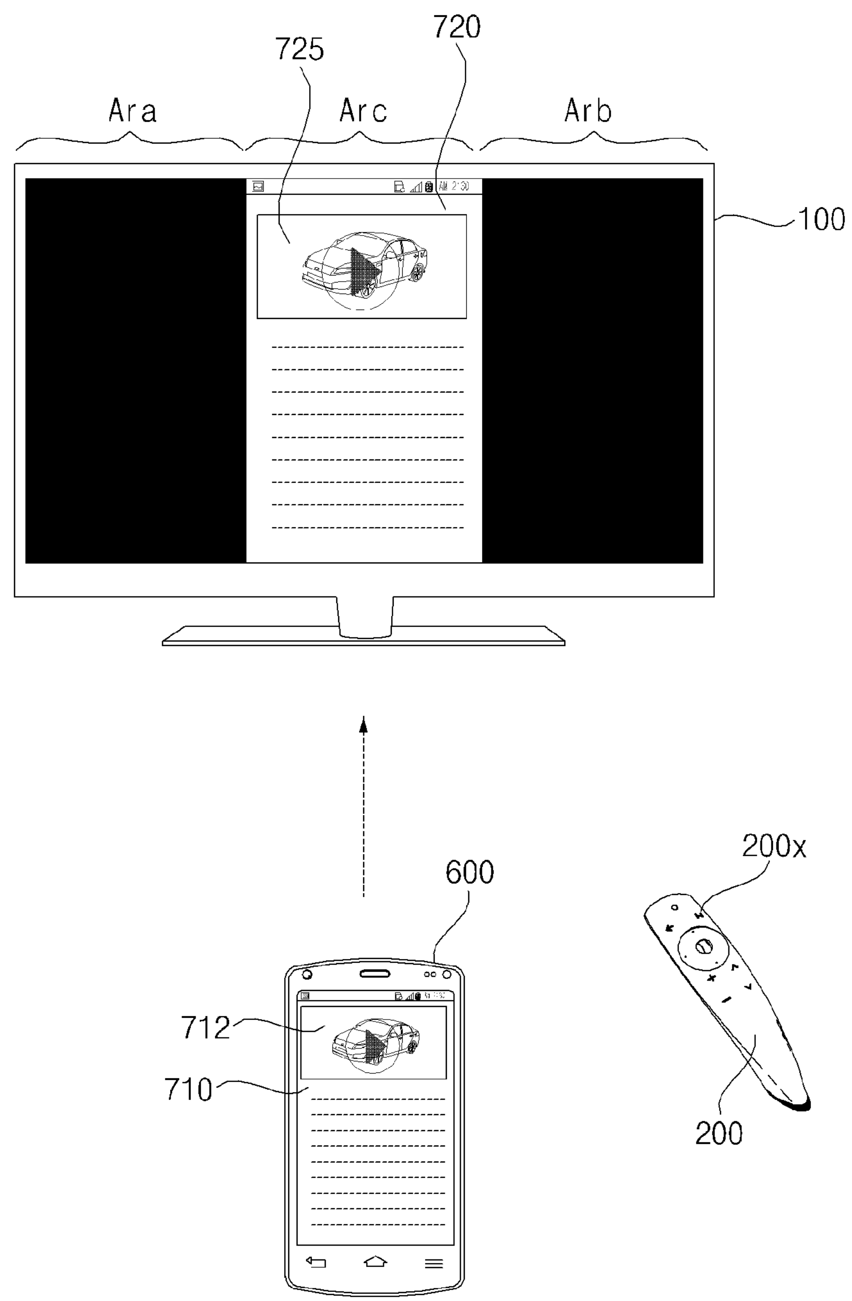

FIG. 7C illustrates an example of displaying additional black images Bla and Blb on the left and right sides of the mirrored image 720.

Meanwhile, the controller 170 of the image display apparatus 100 may display the mirrored image 729 without signal processing of the input image, such as image editing, as illustrated in FIG. 7C. On the contrary, the mirrored image 720 may be displayed after image editing and the like.

Figure 7D:
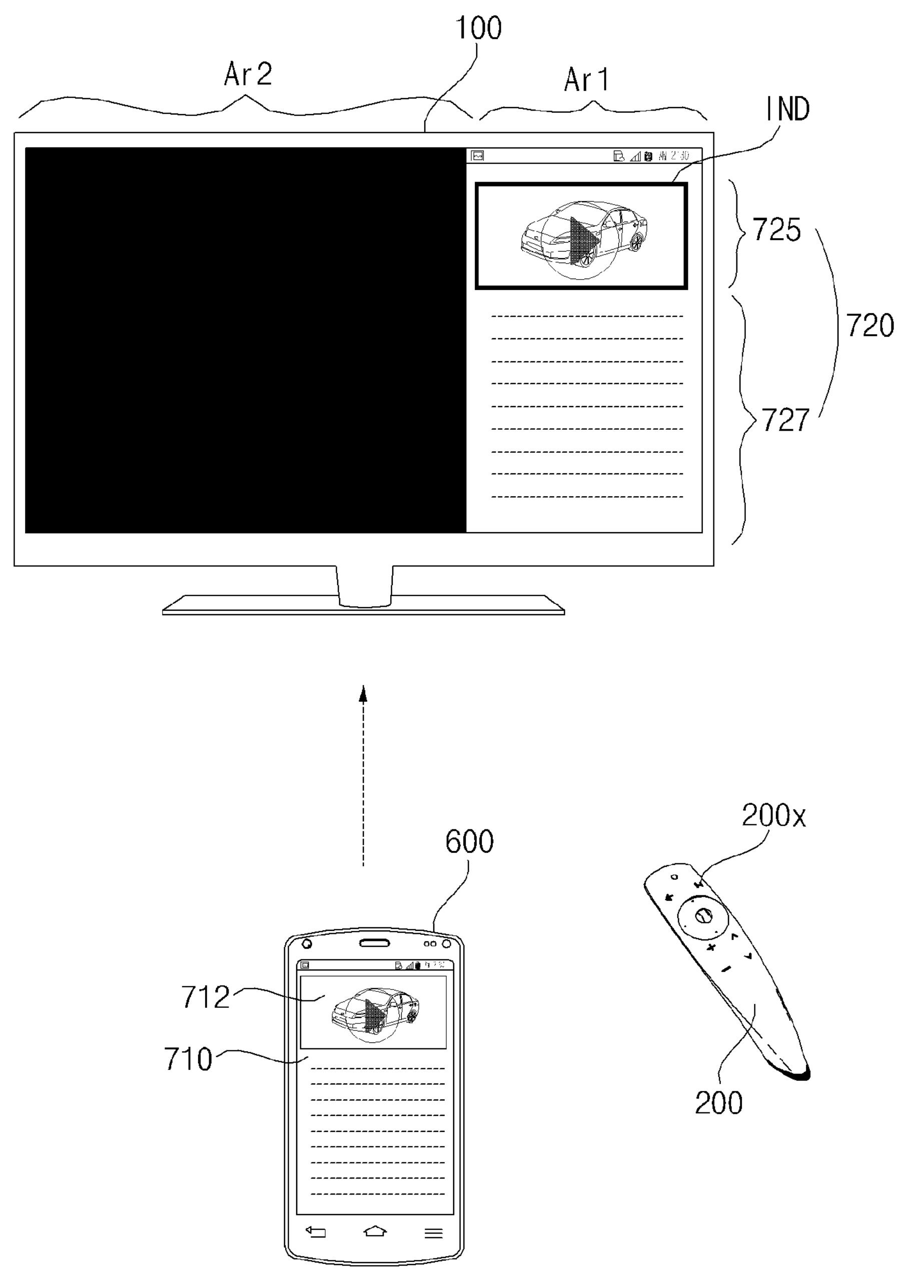

As illustrated in FIG. 7D, it may be controlled that an additional black image Blc is displayed in the area Ar2, and the mirrored image 720 is displayed in the area Ar1 to the right of the area Ar2.

The controller 170 of the image display apparatus 100 may extract the additional black images Bla and Blb from the input image by an area detection technique, generate the additional black image Blc by combining the left and right additional black images Bla and Blc, and control to display the additional black image Blc in the area Ar2, and may control to display the mirrored image 720 in the area Ar1 to the right of the area Ar2.

That is, the controller 170 of the image display apparatus 100 may distinguish an image display area from a non-display area in the mirrored image 720 received from the mobile terminal 600 by the area detection technique, and control to display the image display area of the mirrored image 720 in an area of the display 180.

Alternatively or additionally, the controller 170 of the image display apparatus 100 may control to display only the mirrored image 720 except for the additional black images Bla and Blb out of the image received from the mobile terminal 600.

Subsequently, upon receipt of a partial zoom-in display input for the mirrored image (S630), the controller 170 of the image display apparatus 100 may control to display a zoomed-in image of a first area of the mirrored image (S640).

The partial zoom-in display input for the mirrored image may be generated by manipulation of a zoom-in display button of the remote controller.

Figure 7E:
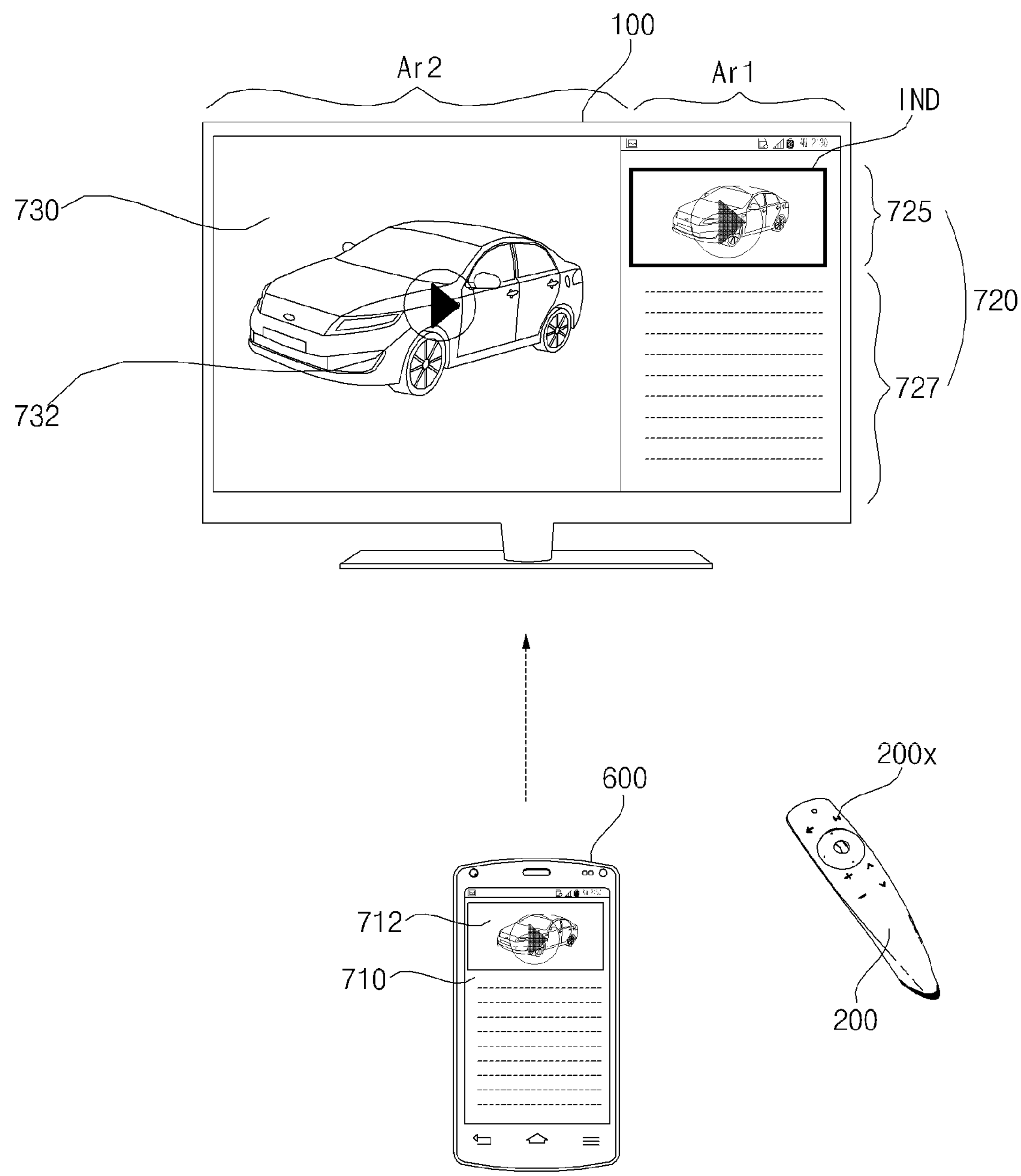

If with the mirrored image 720 displayed, a partial zoom-in display button 200*x* of the remote controller 200 is manipulated as illustrated in FIG. 7C, it may be controlled that only the zoomed-in image 730 is displayed in the area Ar2 except for the area Ar1 displaying the mirrored image 720, as illustrated in FIG. 7E. Accordingly, a zoomed-in image of a partial area of a mirrored image may be displayed simply on the display 180.

If the mirrored image 720 includes the image area 725 and the text area 727 as illustrated in FIG. 7D or 7E, the controller 170 of the image display apparatus 100 may control to display the indicator IND for area selection in the image area 725, and control to display a zoomed-in image of the image area 725 on the display 180.

The controller 170 of the image display apparatus 100 may distinguish the image area 725 from the text area 727 in the mirrored image 720 by area detection, and may control to display the indicator IND in the image area 725 by default.

Meanwhile, the controller 170 of the image display apparatus 100 may control zoom-in, zoom-out, or shift of the indicator IND according to an input signal of the remote controller 200.

Meanwhile, the zoomed-in image 730 displayed in the area Ar2 of the image display apparatus 100 may be an image scaled-up by the controller 170 of the image display apparatus 100.

Alternatively or additionally, the zoomed-in image 730 displayed in the area Ar2 of the image display apparatus 100 may be an image that the mobile terminal 600 has scaled up and transmitted.

For example, if the indicator for selecting the first area is displayed in the image area of the mirrored image, the zoomed-in image 730 displayed in the area Ar2 of the image display apparatus 100 may be transmit a zoomed-in image transmission request for the image area of the mirrored image to the mobile terminal 600, and control to display a zoomed-in image received from the mobile terminal 600 on the display 180.

Alternatively or additionally, the zoomed-in image 730 displayed in the area Ar2 of the image display apparatus 100 may be an image that an external server has provided.

For example, if the zoomed-in image 730 displayed in the area Ar2 of the image display apparatus 100 is an image that an external server (not shown) provides, the controller 170 of the image display apparatus 100 may request a zoomed-in image of the image displayed on the mobile terminal 600 to the external server, using a URL of the external server, and control to display the zoomed-in image received from the external server.

The external server may be a server that streams a still image or a video. Specifically, the external server may be a Web portable server, a video providing server, or the like.

Figure 7F:
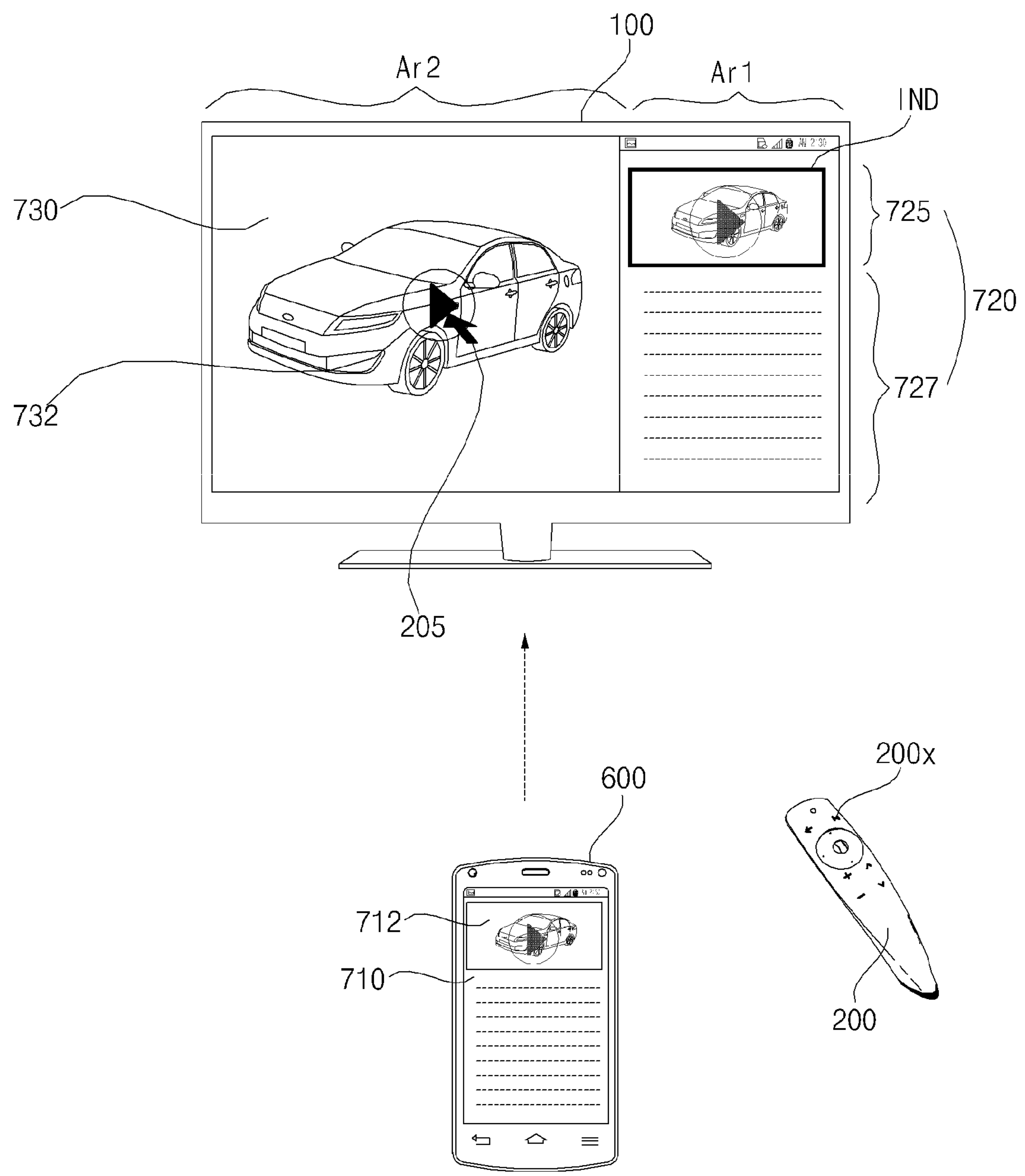
Figure 7G:
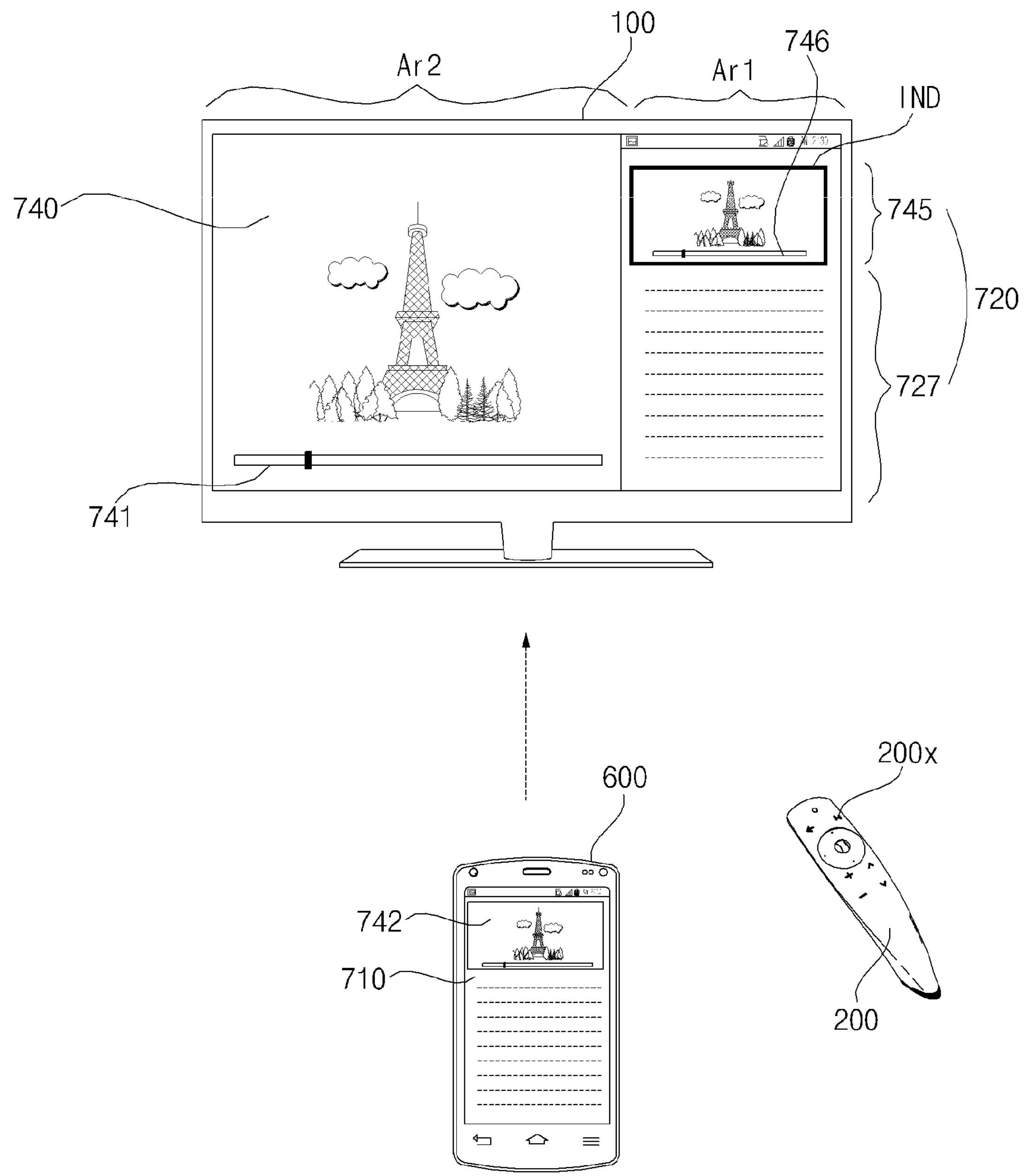

Meanwhile, if a play icon 732 on the zoomed-in image 730 displayed in the area Ar2 of the image display apparatus 100 is selected as illustrated in FIG. 7F, the controller 170 of the image display apparatus 100 may play the zoomed-in image 730 and control to display a played image 740 in the area Ar1, as illustrated in FIG. 7G.

FIG. 7F illustrates an example of selecting the play icon 732 by the pointer 205 representing movement of the remote controller 200.

Upon selection of the play icon 732, the controller 170 of the image display apparatus 100 may request a play request to the mobile terminal 600, receive an image played in the mobile terminal 600, and control play and display of a zoomed-in image of the played image.

Alternatively or additionally, upon selection of the play icon 732, the controller 170 of the image display apparatus 100 may request a zoomed-in played image to be played on the image display apparatus 100 having a higher resolution that the mobile terminal 600 to an external server (not shown), using a URL of the external server, and control to display the zoomed-in played image received from the external server.

In FIG. 7G, as an image in the mirrored image 720 displayed in the area Ar1 is also played in correspondence with the played image 740 displayed in the area Ar2, a played image 746 is displayed in the area Ar1. Further, a played image 742 is also displayed on the display 680 of the mobile terminal 600.

In the area Ar2, a status bar 741 indicating a play progress status may further be displayed in addition to the played image 742.

That is, in the case where the play icon 732 is selected as illustrated in FIG. 7F, a small play icon on the mirrored image 720 is selected, or a small play icon on the mobile terminal 600 is selected, the played images may be displayed respectively, as illustrated in FIG. 7G.

Figure 7H:
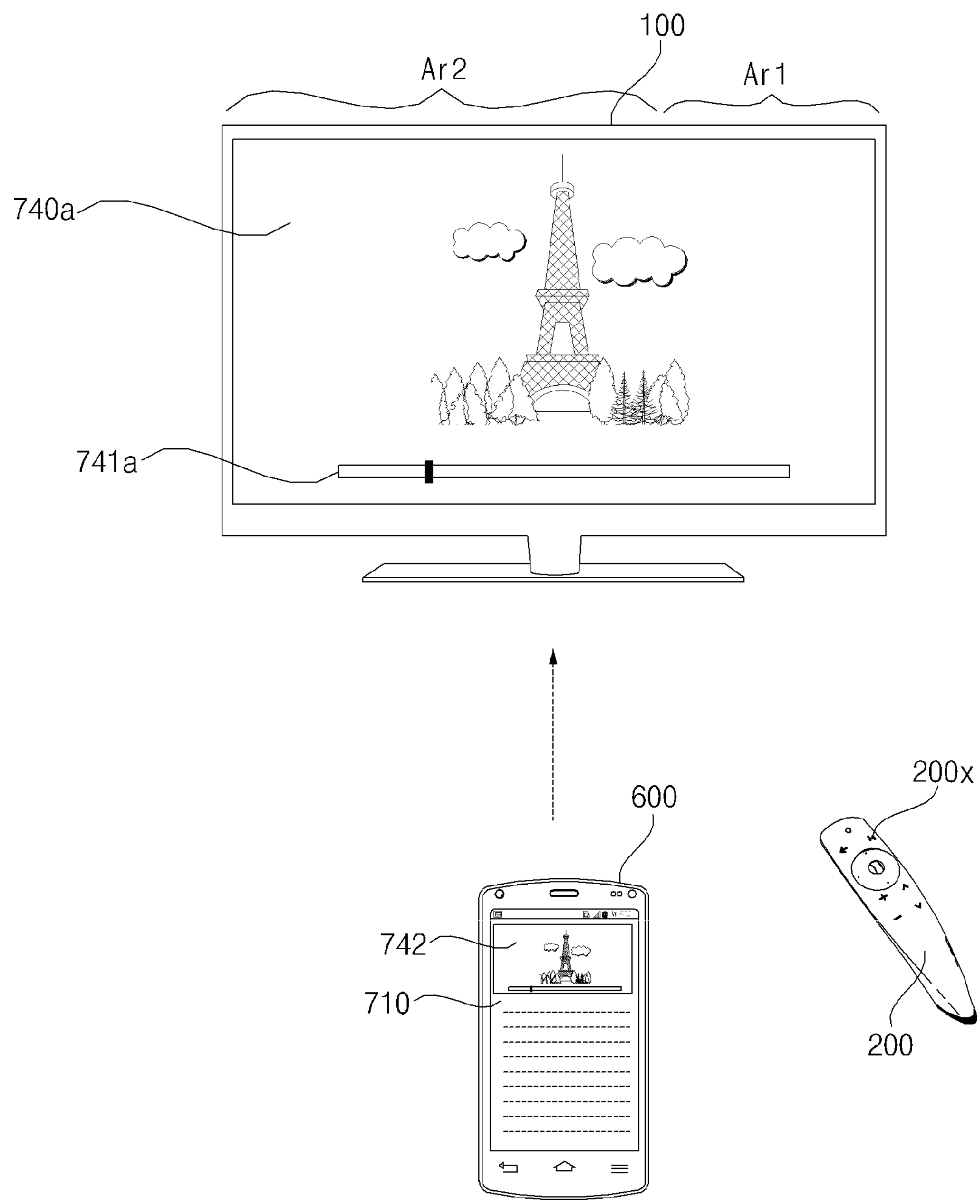

Then, if a predetermined time has elapsed after the zoomed-in image of the first area is displayed, the controller 170 of the image display apparatus 100 may control disappearance of the displayed mirrored image and full-screen display of the zoomed-in image on the entirety of the display 180, as illustrated in FIG. 7H (S660).

FIG. 7H illustrates an example in which the mirrored image 720 displayed in the area Ar2 disappears, the zoomed-in image displayed in the area Ar2 is enlarged, and a largest zoomed-in image 740*a* is displayed in full screen on the entirety of the display 180. Therefore, the user may be more immersed in the zoomed-in image 740*a*.

Figure 7I:
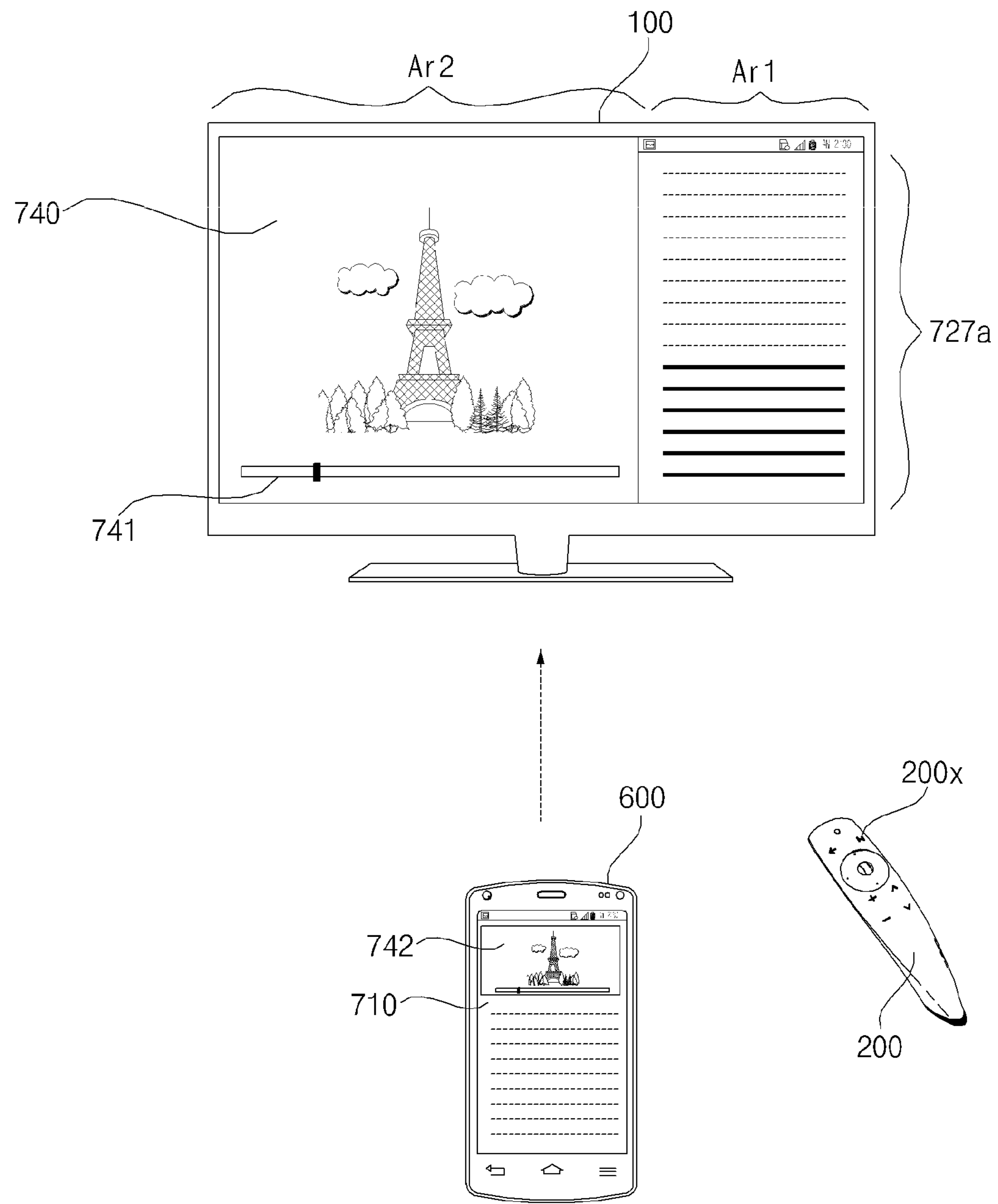

Unlike the full-screen display in FIG. 7H, if the predetermined time has elapsed after the zoomed-in image of the first area is displayed, the controller 170 of the image display apparatus 100 may control the image area of the mirrored image to disappear and, instead, control the text area to be displayed, as illustrated in FIG. 7I. Herein, the played image 740 is still displayed.

In FIG. 7I, although the mirrored image 720 is still displayed in the area Ar1, the image area disappears and only the text area 727*a* is displayed.

In the text area 727*a*, the displayed text is zoomed in, or additional undisplayed text may be included. The area Ar2 may be dedicated to display of the zoomed-in played image 740, and the area Ar1 may be dedicated to display of the text area.

The method of FIG. 7H is applicable for displaying a zoomed-in image before a played image is displayed. That is, when a zoomed-in image is displayed in the area AR2, it is possible to remove an image area and instead, to display only a text area in the area Ar1.

Figure 8A:
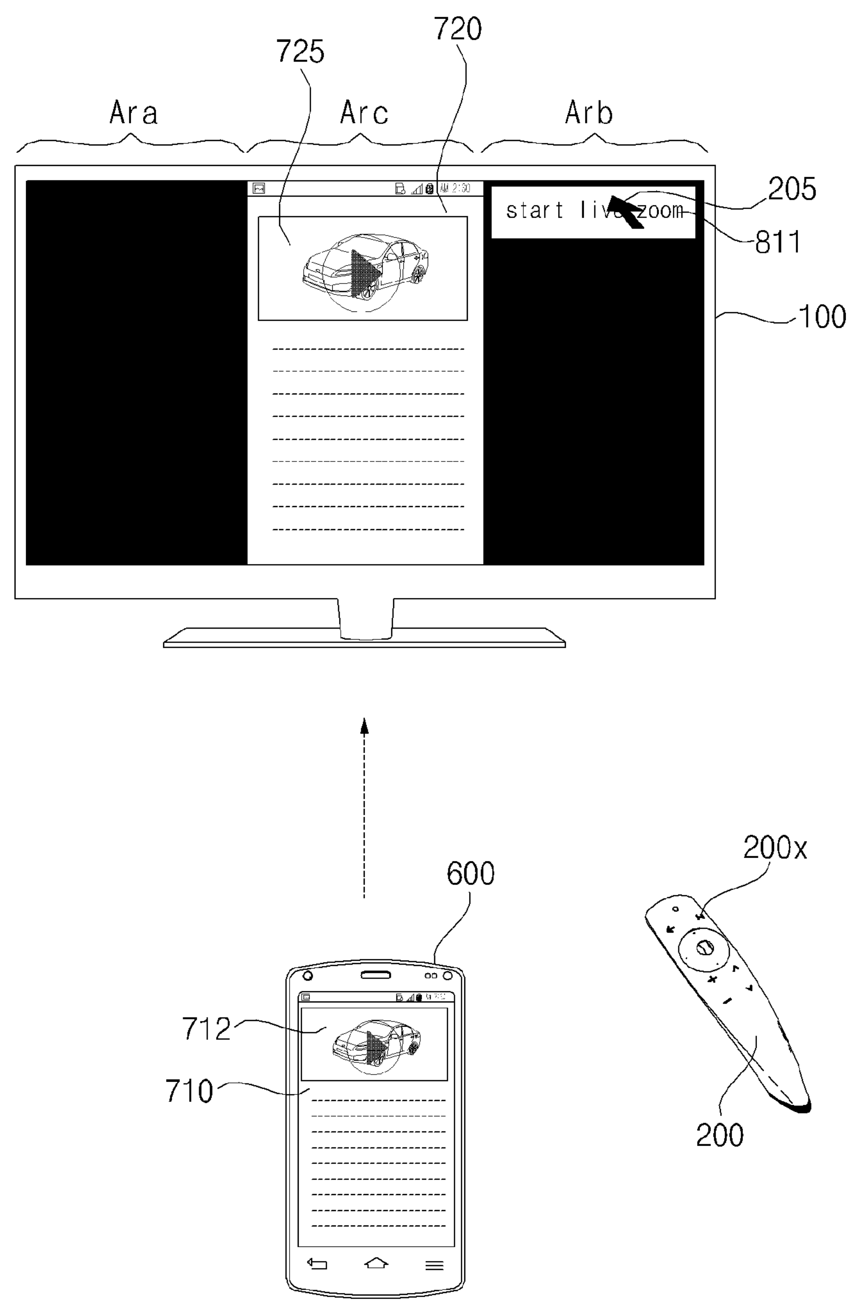

Meanwhile, with the mirrored image 720 displayed, the controller 170 of the image display apparatus 100 may control to display an icon 811 for zoom-in display according to a predetermined input, as illustrated in FIG. 8A.

Figure 8B:
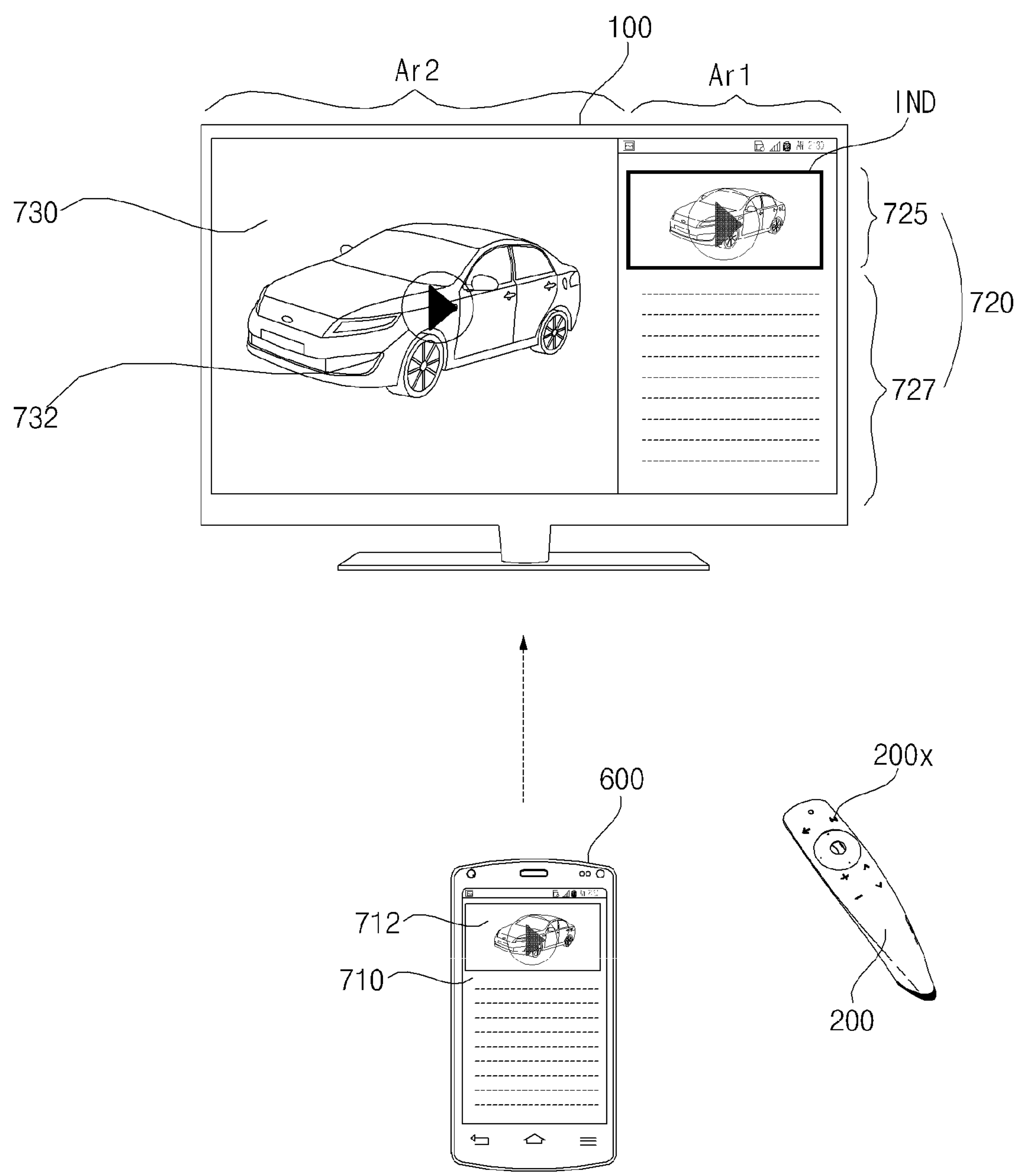

Upon selection of the icon 811 for zoom-in display by the pointer 205 representing movement of the remote controller 200, the controller 170 of the image display apparatus 100 may control to display the zoomed-in image 730 of the first area in the mirrored image in the area Ar1 of the display 180, as illustrated in FIG. 8B. Herein, the mirrored image 720 may be displayed in the area Ar1.

Meanwhile, if with the zoomed-in image 730 displayed, the mobile terminal 600 is switched from landscape mode to portrait mode or from the portrait mode to the landscape mode, the controller 170 of the image display apparatus 100 may control to display the zoomed-image 730 as it is and display of the mirrored image changed according to the mode of the mobile terminal 600.

Figure 8C:
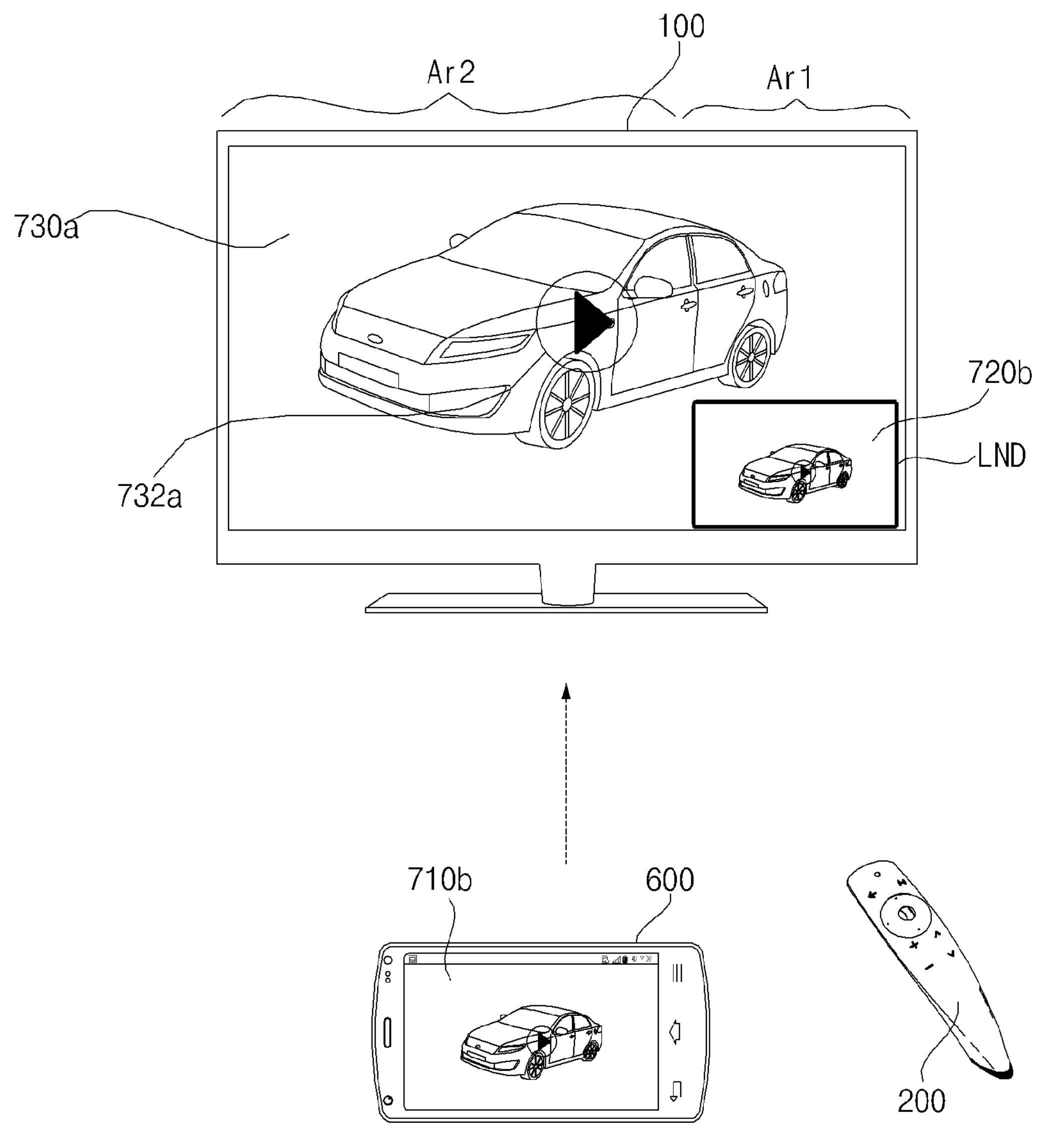

For example, as illustrated in FIG. 8C, if the mobile terminal 600 is switched from the portrait mode to the landscape mode, an image 710*b* displayed on the mobile terminal 600 includes only an image area without a text area. Therefore, a mirrored image 720*b* displayed on the image display apparatus 100 may include only an image area without a text area. Therefore, the size of the display area of the mirrored image may be decreased, as illustrated in FIG. 8C.

However, even though the mobile terminal 600 is switched from the portrait mode to the landscape mode, the zoomed-in image 730 may still be displayed in the area Ar2.

Meanwhile, even though the mobile terminal 600 is switched from the landscape mode illustrated in FIG. 8C to the portrait mode illustrated in FIG. 8B, the zoomed-in image 730 may still be displayed in the area Ar2. However, the size of the display area of the mirrored image may be increased and thus the text area may also be displayed.

Meanwhile, the controller 170 of the image display apparatus 100 may control the display position of a mirrored image to be changed according to a shift input for the mirrored image.

Particularly, upon receipt of a shift input for the mirrored image with the zoomed-in image 730 displayed, the controller 170 of the image display apparatus 100 may control the display position of the mirrored image to be changed.

Figure 9A:
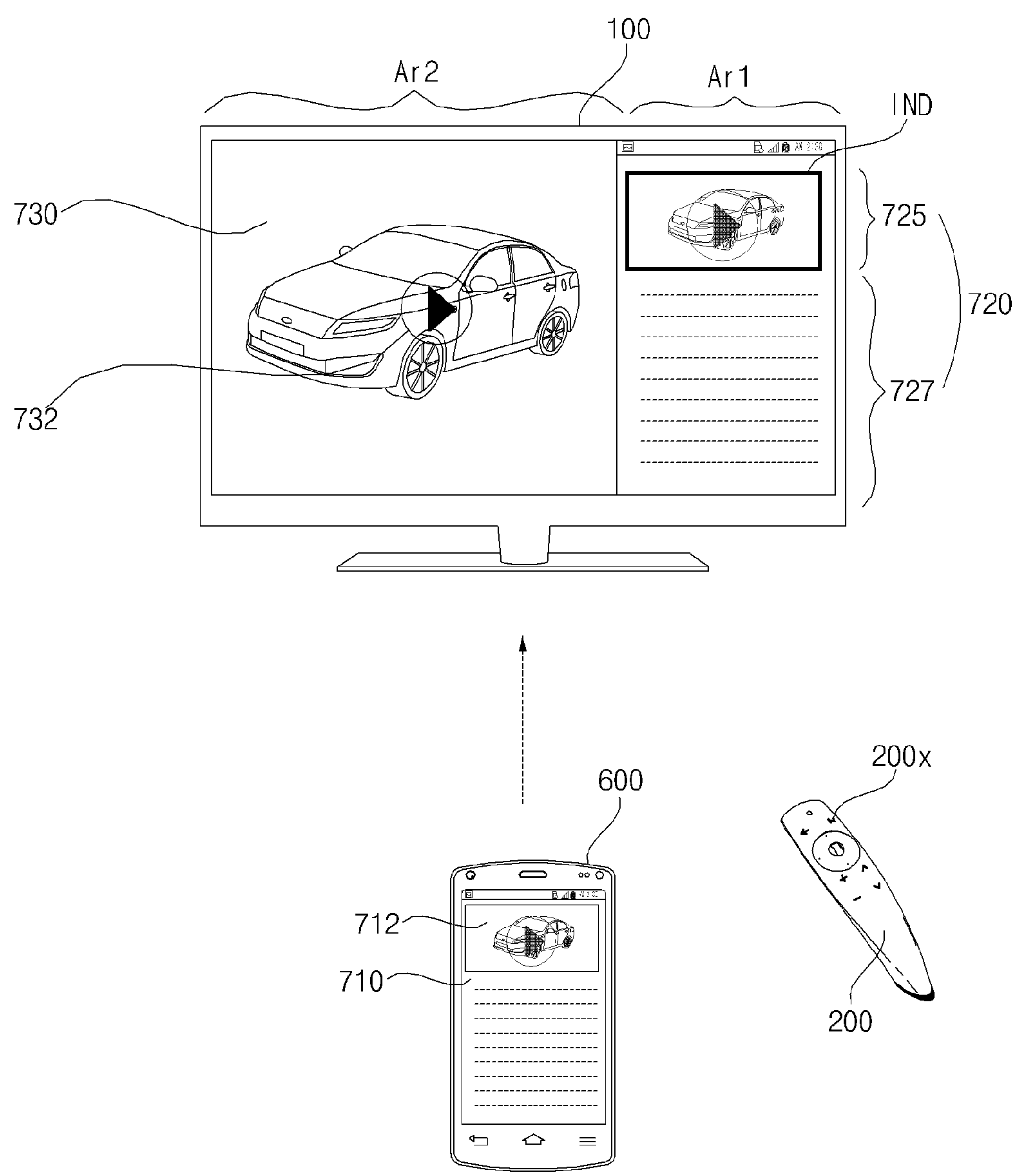

FIG. 9A illustrates an example of displaying the zoomed-in image 730 in the area Ar2 on the left side of the display 180, and the mirrored image 720 in the area Ar1 on the right side of the display 180.

Meanwhile, the controller 170 of the image display apparatus 100 may change the display positions of the zoomed-in image 730 and the mirrored image 720 in response to input of a directional key or the like of the remote controller 200.

Figure 9B:
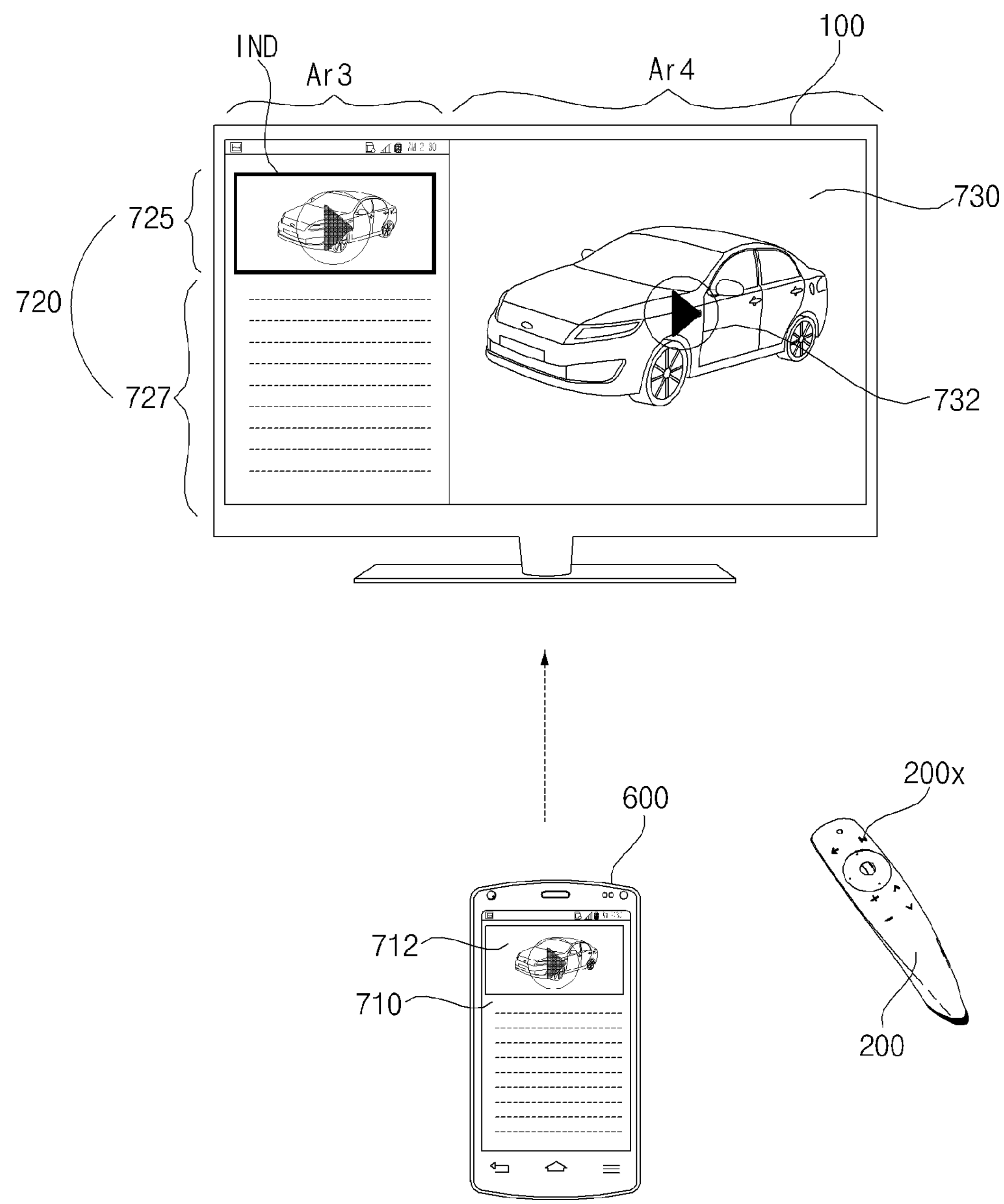

That is, as illustrated in FIG. 9B, the zoomed-in image 730 may be displayed in an area Ar4 on the right side of the display 180, and the mirrored image 720 may be displayed in an area Ar3 on the left side of the display 180. Therefore, the user may view an intended image in an intended area.

Meanwhile, the controller 170 of the image display apparatus 100 may control to display a mirrored image and a zoomed-in image differently in the portrait mode and a normal mode.

Figure 10A:
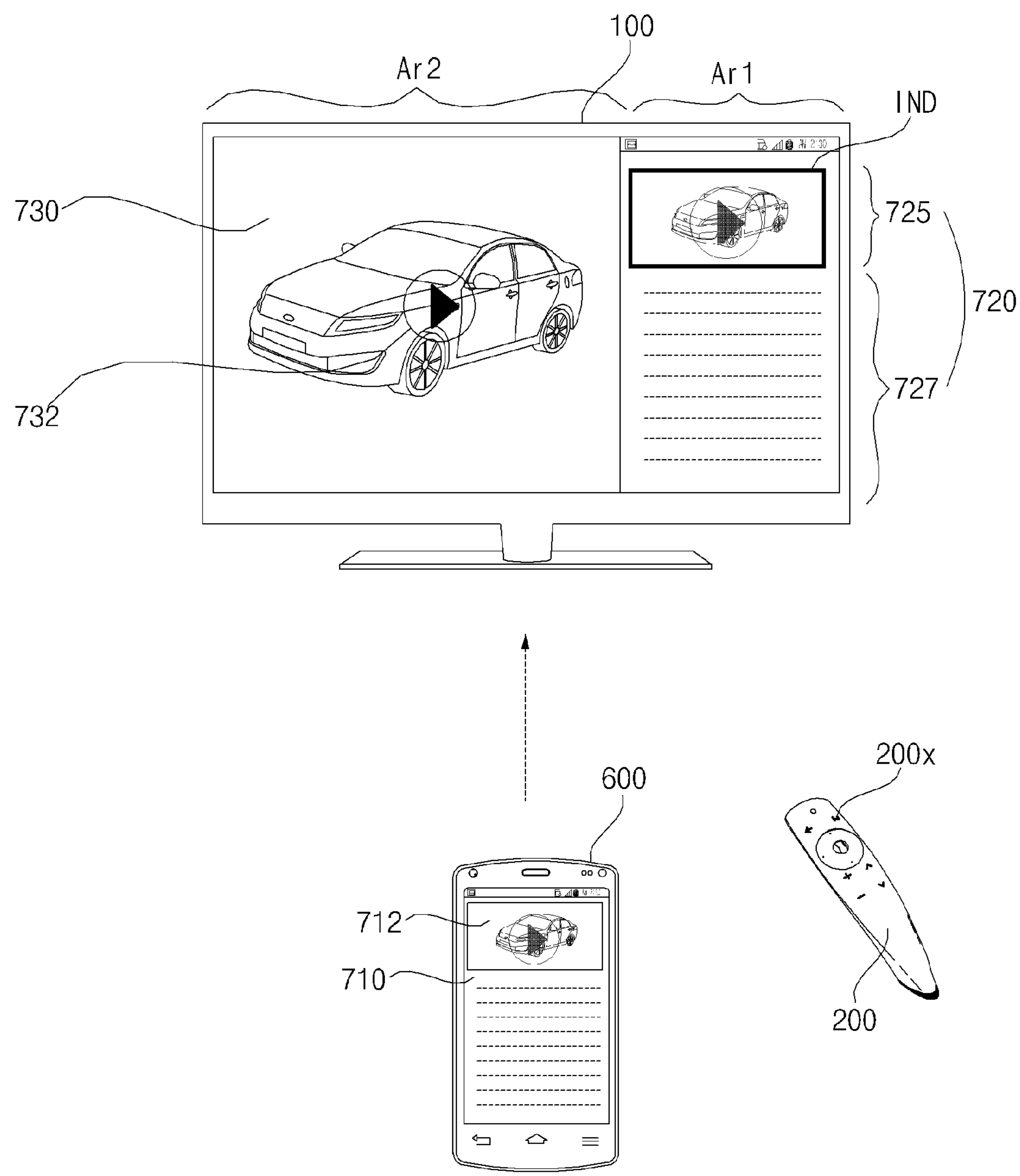

FIG. 10A illustrates an example of displaying the zoomed-in image 730 in the area Ar2 and the mirrored image 720 in the area Ar1 in the portrait mode.

Figure 10B:
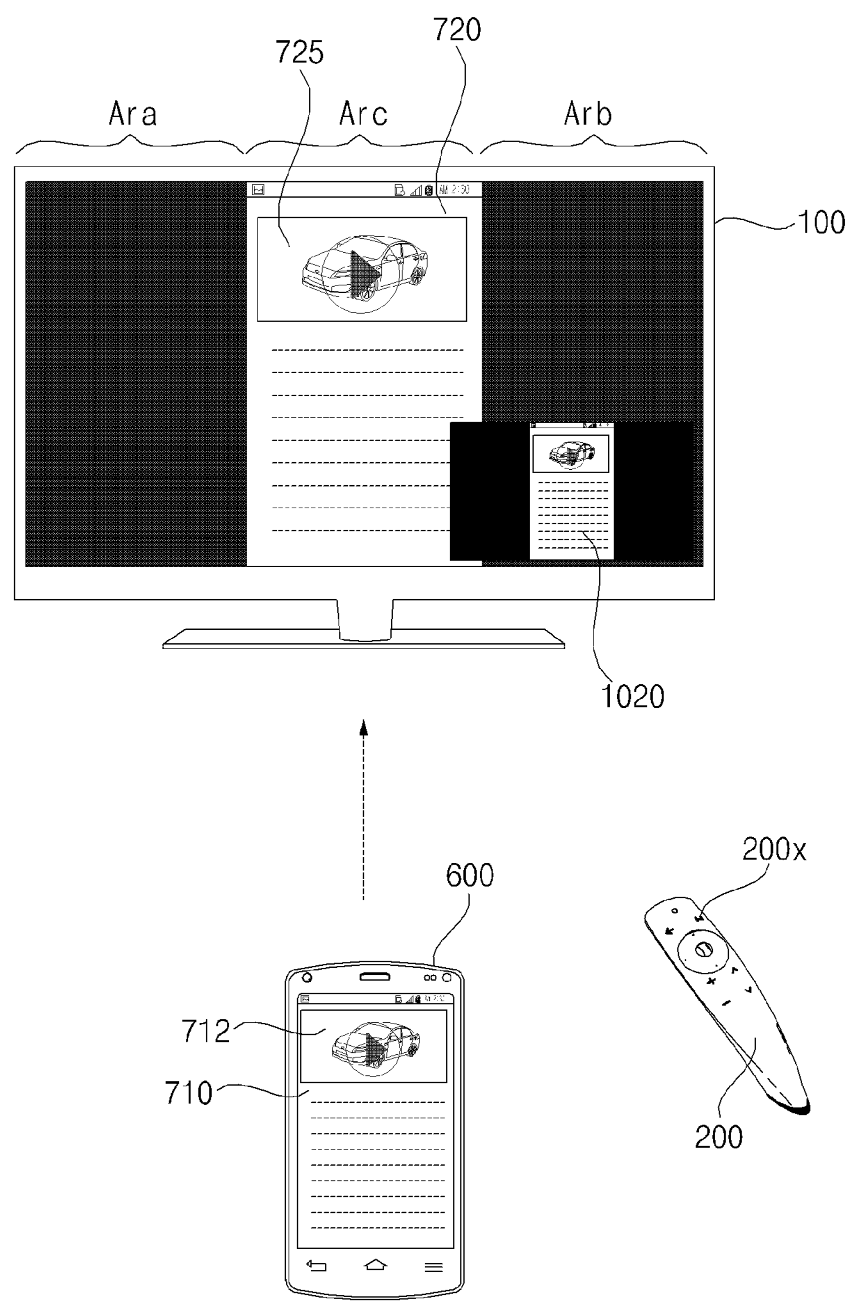

FIG. 10B illustrates an example of displaying a mirrored image 1020 in a bottom right part, and positioning the indicator IND on the entire area of the mirrored image 1020.

Particularly, with additional black images added to the left and right sides of the mirrored image 1020, the indicator IND is positioned on the entire area including the additional images.

In this case, the zoomed-in image 720 obtained by scaling up the entire area of the mirrored image 1020 may be displayed on the display 180.

That is, as illustrated in FIG. 10B, the additional black images may be displayed added in left and right areas Ara and Arb of the mirrored image 1020 displayed in an area Arc. Thus, user convenience may be increased by providing these various UIs.

Figure 11A:
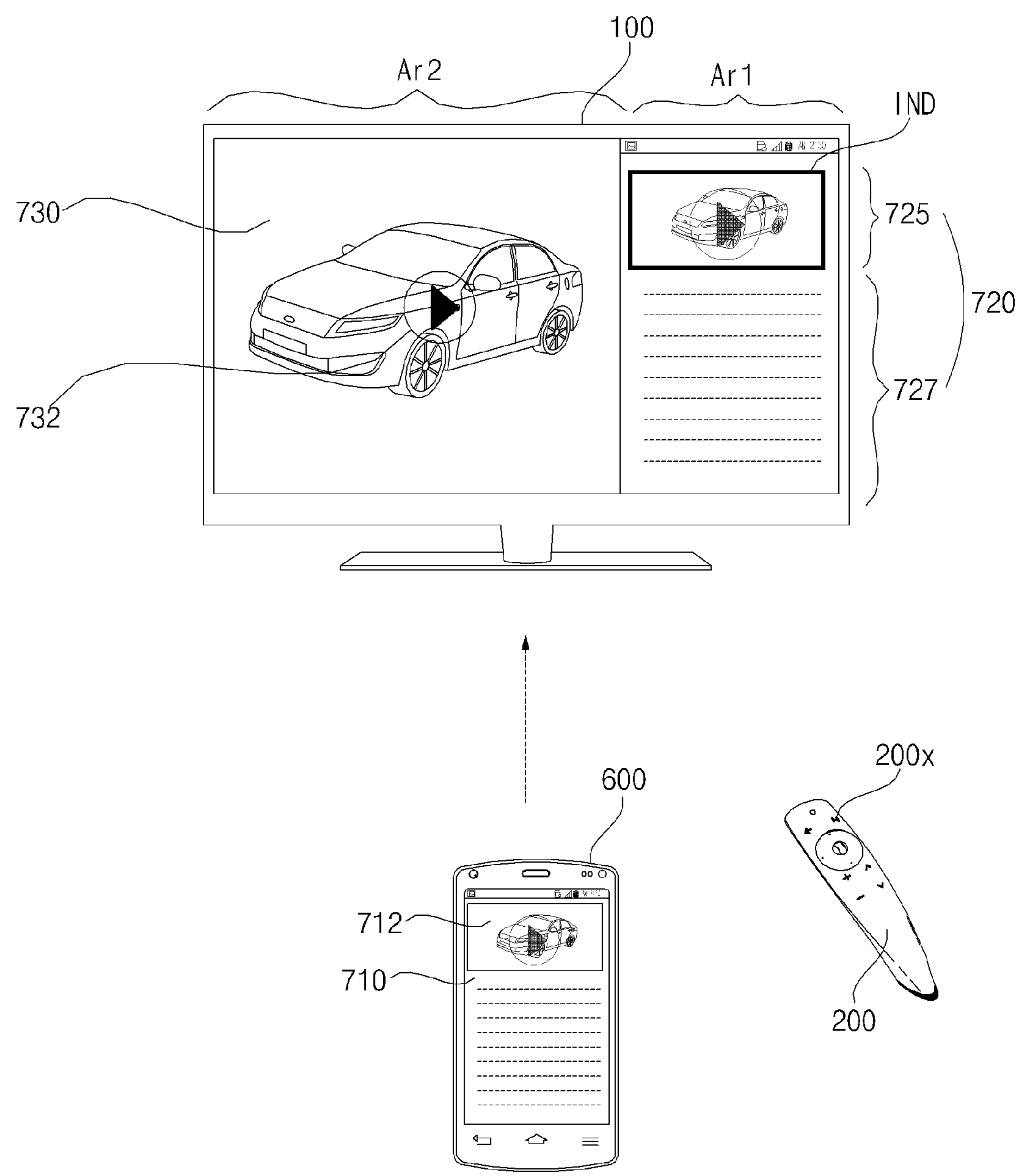

FIG. 11A illustrates an example of displaying the zoomed-in image 730 in the area AR2 and the mirrored image 720 in the area Ar1.

Figure 11B:
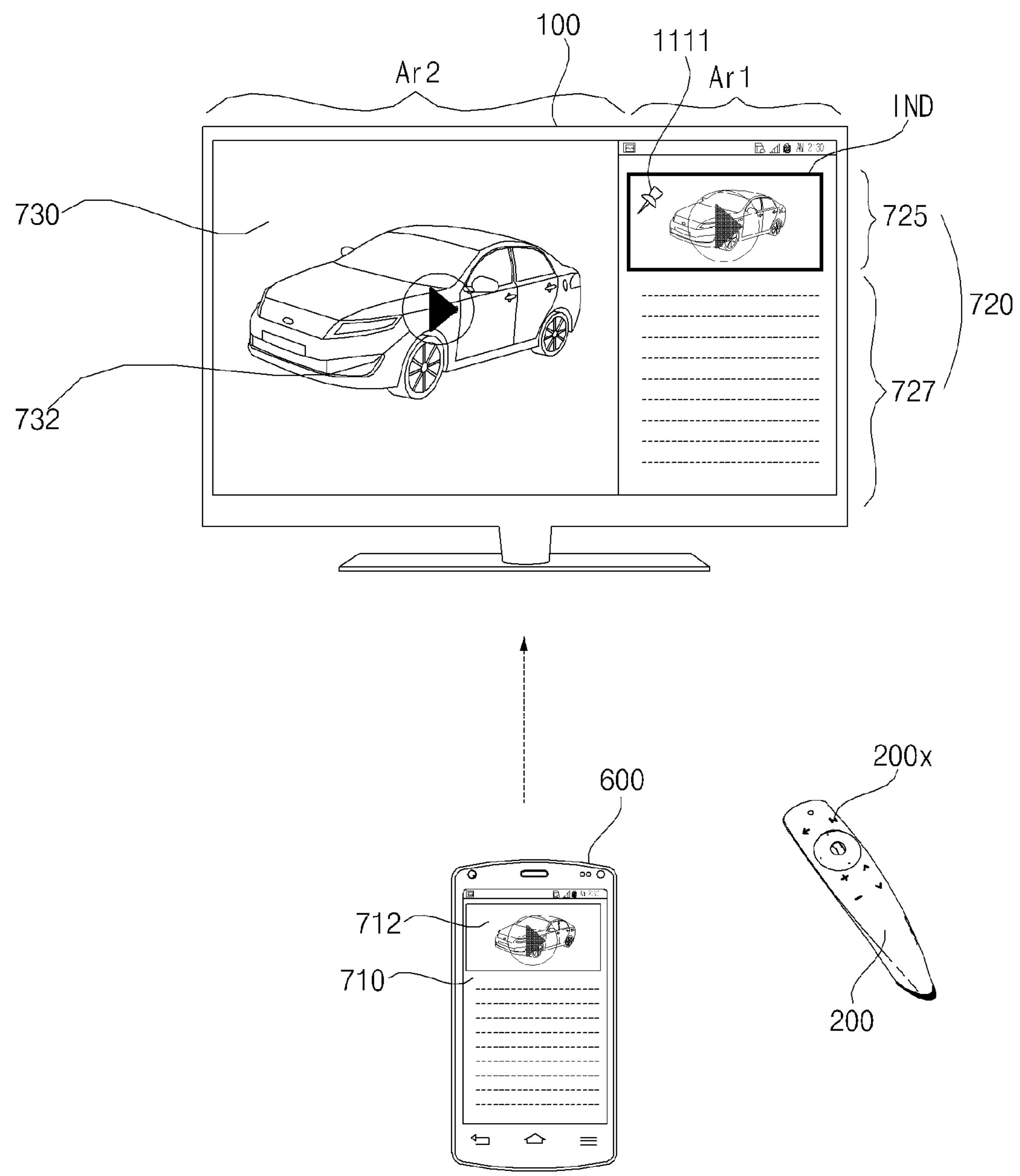

To fix an area to be zoomed in on, the controller 170 of the image display apparatus 100 may control to display an icon 1111 representing fixing on an image area of the mirrored image, as illustrated in FIG. 11B. Therefore, the fixed image area 725 of the mirrored image 720 may be zoomed in on so that the zoomed-in image 730 may be displayed in the area Ar2.

Meanwhile, the controller 170 of the image display apparatus 170 may apply different settings to manipulation of the remote controller 200, for display of a zoomed-in image and display of a mirrored image.

For example, an image display area of the mirrored image 720, that is, a third area POSc can be dragged by manipulation of the remote controller 200, whereas a first area POSa of the zoomed-in area 730 and a second area POSb of the mirrored image 720 cannot be dragged by manipulation of the remote controller 200.

Figure 12A:
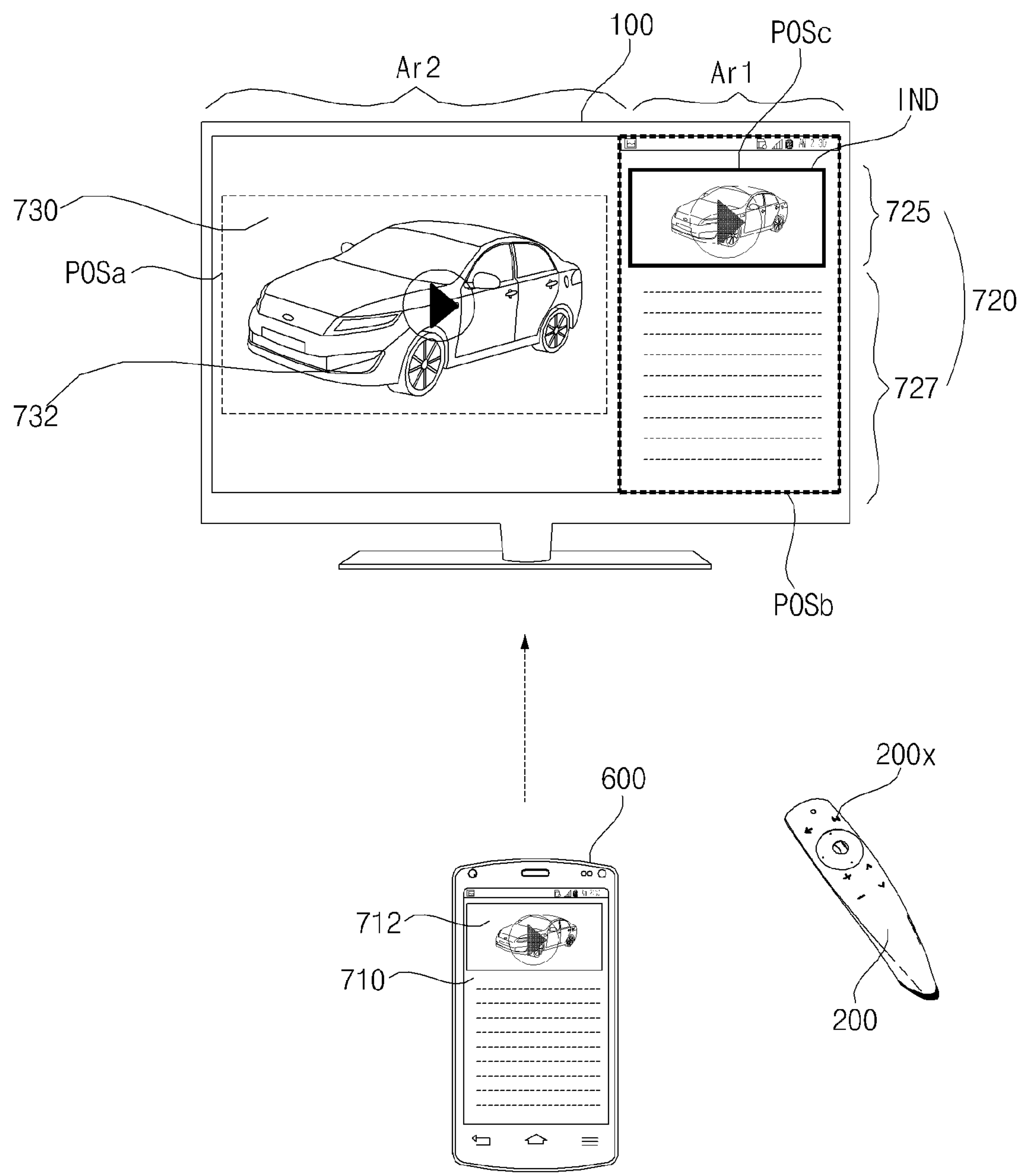
Figure 12B:
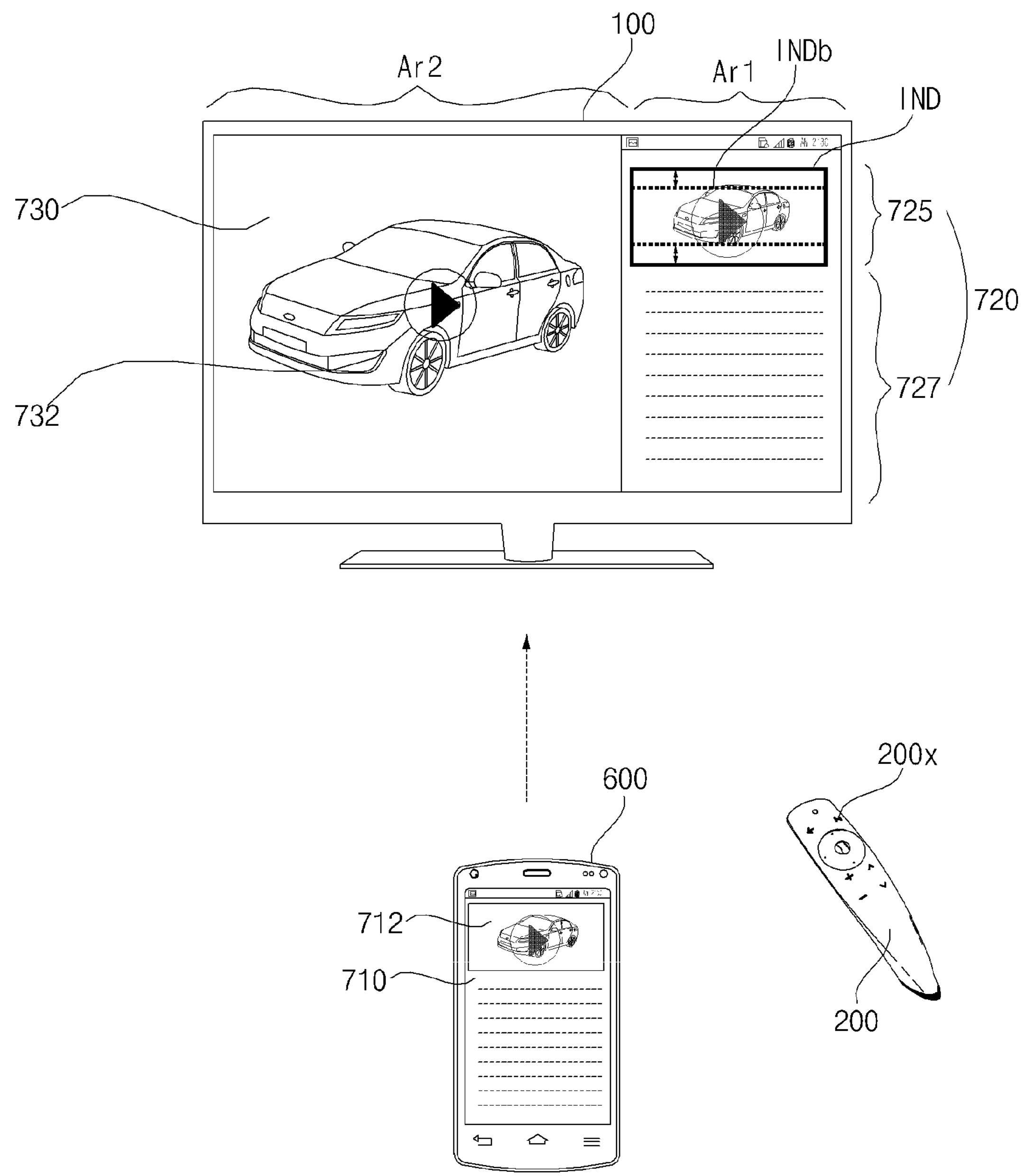

With the indicator IND displayed in the third area POSc being the image display area of the mirrored image illustrated in FIG. 12B, if a wheel key of the remote controller 200 is manipulated, the controller 170 of the image display apparatus 100 controls the size (particularly, height) of the indicator IND to be changed, but a text area in the second area POSb of the mirrored image 720 may be scrolled by manipulation of the wheel key.

Figure 12C:
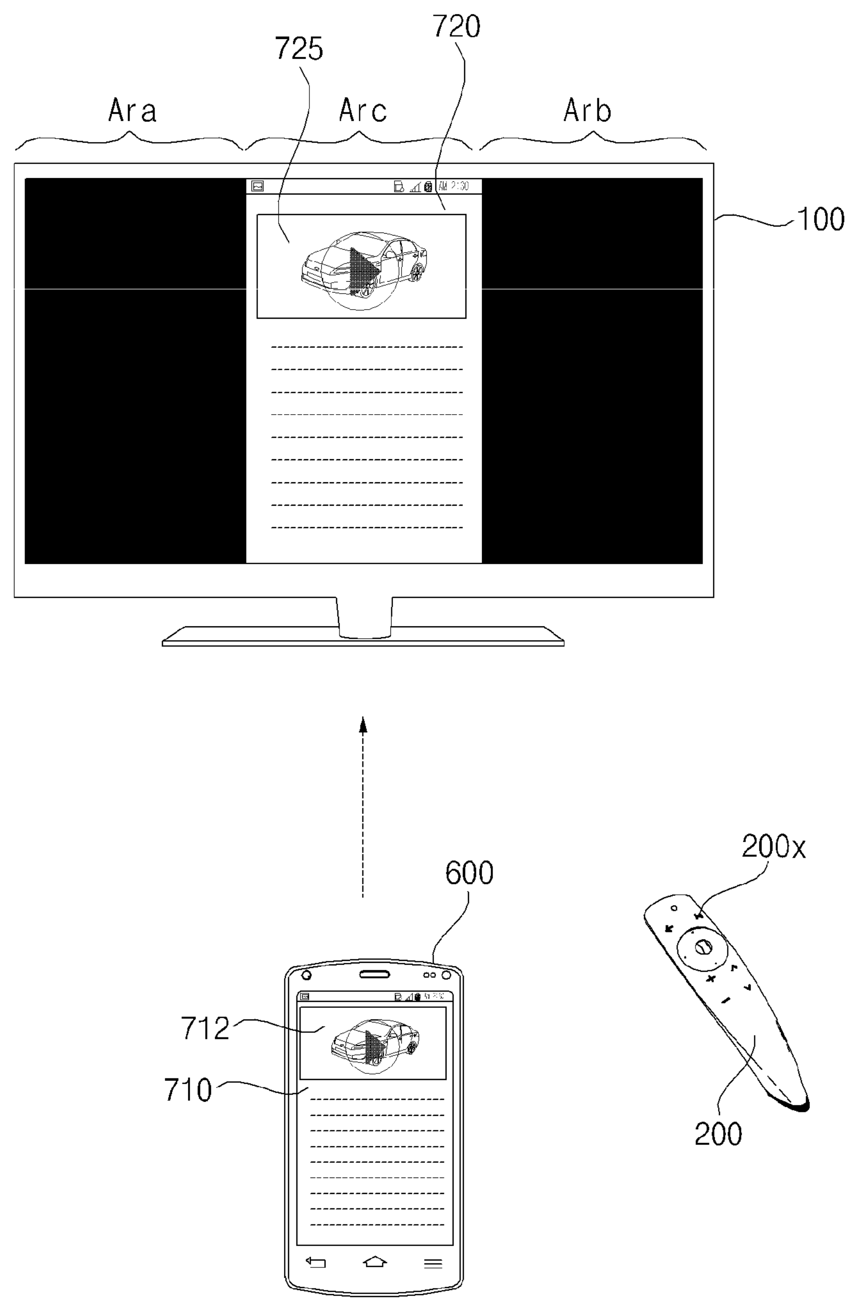

Meanwhile, the controller 170 of the image display apparatus 100 may detect the mirrored image 720 except for the additional images in the areas Ara and Arb by the area detection technique during display of the additional black images, as illustrated in FIG. 12C. As illustrated in FIG. 7E, it may be controlled that the mirrored image 720 is displayed in the right area, Ar1.

Meanwhile, during display of a mirrored image, the controller 170 of the image display apparatus 100 may detect areas in the mirrored image. If an image area is included in the mirrored image, the controller 170 of the image display apparatus 100 may control to display the indicator for selecting a first area in the image area.

If the image area 725 is located at a top end of the mirrored image as illustrated in FIG. 7E, the controller 170 of the image display apparatus 100 may control to display the indicator IND at the top end.

Figure 13:
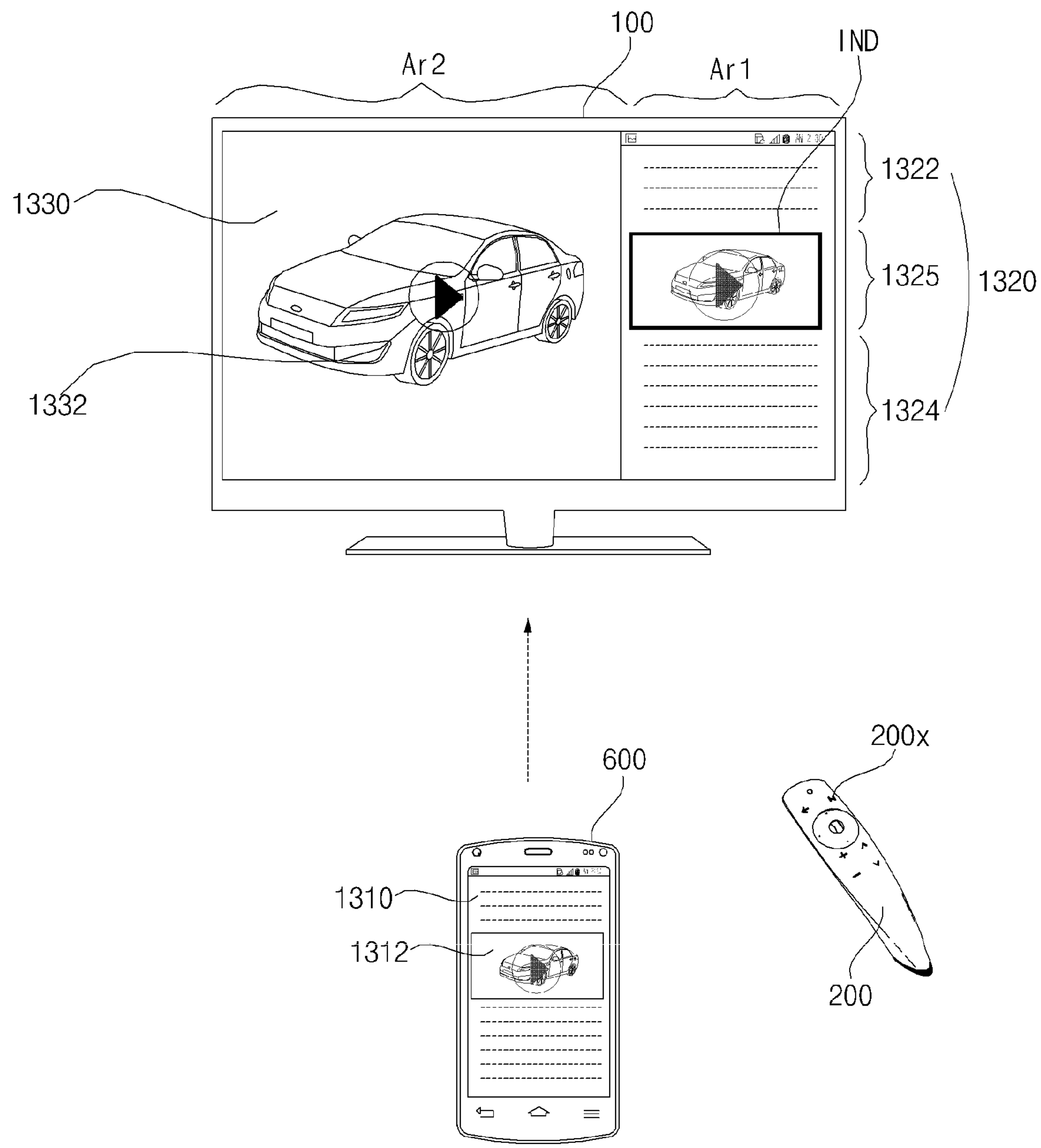

Meanwhile, if an image area 1325 is located at a center of a mirrored image 1320, the controller 170 of the image display apparatus 100 may detect the location of the mirrored image 1320 and control to display the indicator IND at the center, as illustrated in FIG. 13.

Meanwhile, if a plurality of thumbnail images are included in a mirrored image, the controller 170 of the image display apparatus 100 may control to display an indicator for selecting a first area on one of the thumbnail images, and control to display a zoomed-in image of the thumbnail image on which the indicator is displayed.

Meanwhile, if the mirrored image is a gallery image of the mobile terminal 600, the controller 170 of the image display apparatus 100 may control to display an indicator for selecting a first area, on a thumbnail image of a video among a plurality of thumbnail images, and may control to display a zoomed-in image of the thumbnail image of the video on which the indicator is displayed, on the display 180.

Meanwhile, upon receipt of a play input for a thumbnail image of a video, the controller 170 of the image display apparatus 100 may control transmission of a video play request to the mobile terminal 600, reception of a video played in correspondence with the thumbnail image, and zoomed-in display of the received video.

The above operation will be described with reference to FIGS. 14A to 14I.

Figure 14A:
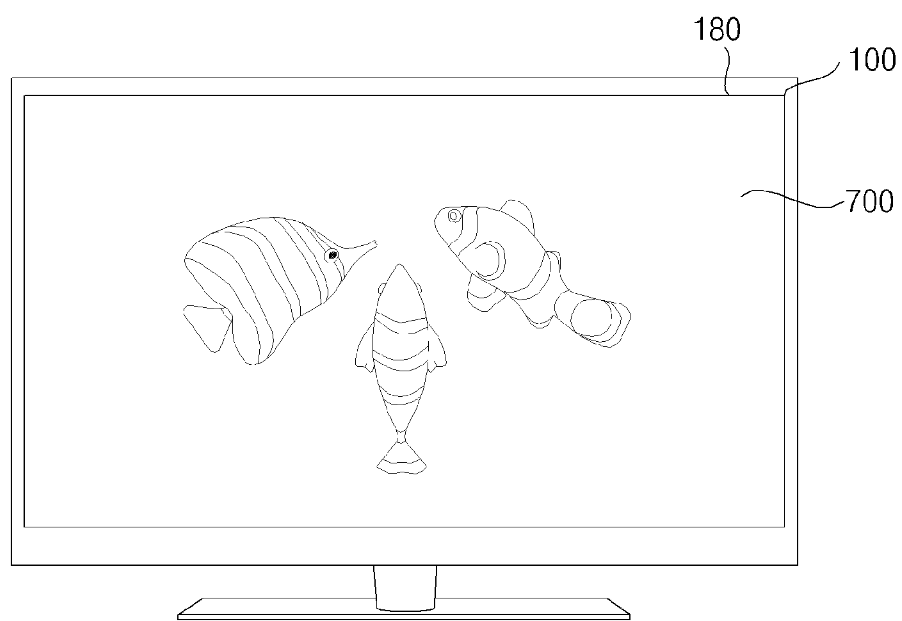
Figure 14B:
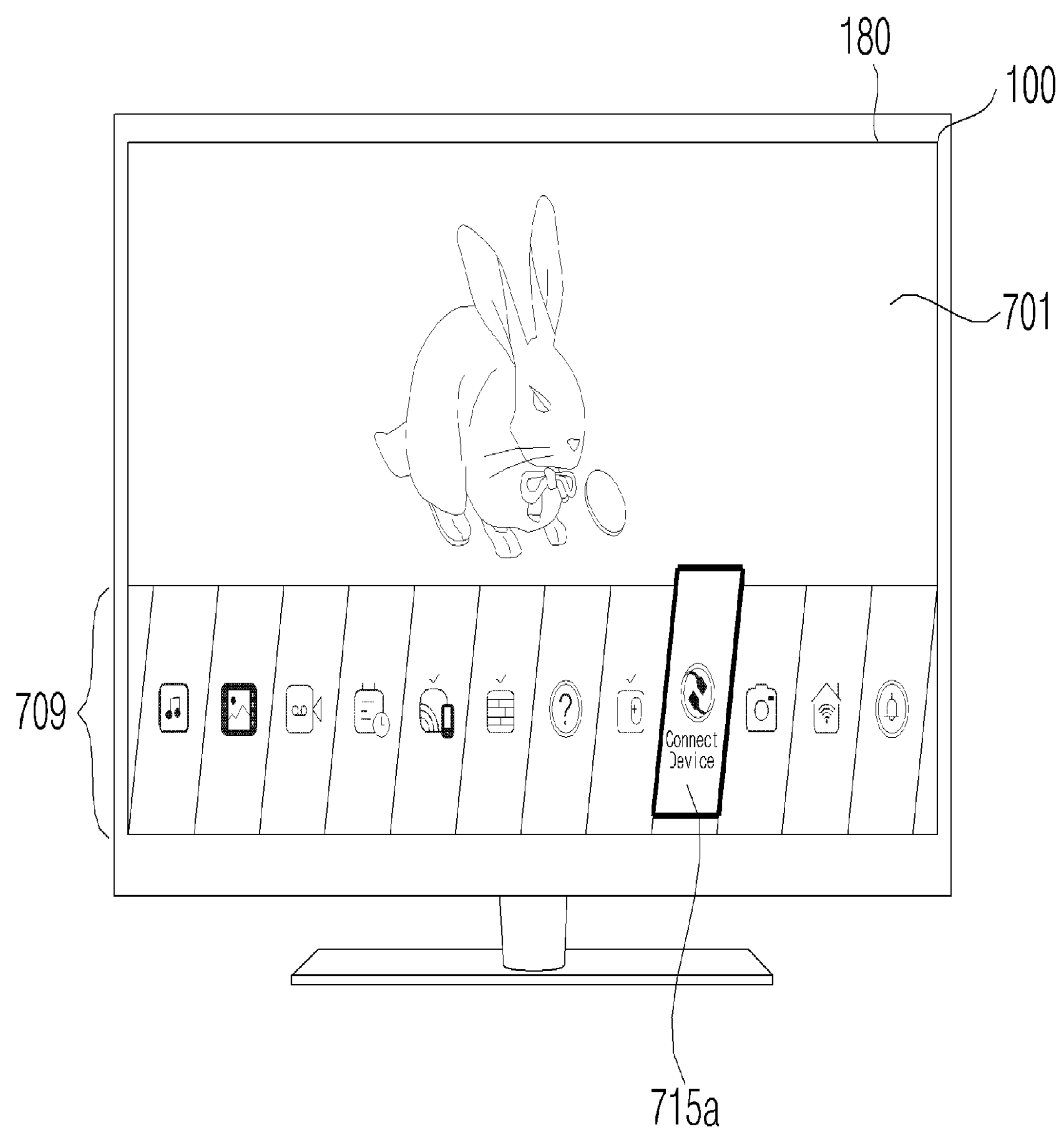

Upon receipt of a menu input with the specific image 700 such as a broadcast image displayed as illustrated in FIG. 14A, the controller 170 of the image display apparatus 100 may control to display the application list 709 including a plurality of application items on a part of the display 180, as illustrated in FIG. 14B.

The application list 709 may include a plurality of application items. The application list 709 is shown in FIG. 14B as including the mirroring application item 715*a*, by way of example.

Upon selection of the mirroring application item 715*a* using the remote controller 200, the controller 170 of the image display apparatus 100 may control mirroring with the preset mobile terminal 600.

Meanwhile, as the image display apparatus 100 has been wirelessly connected to the mobile terminal 600, the controller 170 of the image display apparatus 100 may determine that the mirroring input has been received.

Alternatively or additionally, upon selection of the mirroring application item 705*a*, the controller 170 of the image display apparatus 100 may determine that the mirroring input has been received.

Subsequently, in response to the mirroring input, the mobile terminal 600 may transmit, as a mirrored image, an image displayed on the display 680 of the mobile terminal 600 to the image display apparatus 100.

Therefore, the controller 170 of the image display apparatus 100 may receive the mirrored image through the interface 135, and may control to display the received mirrored image on the display 180.

Meanwhile, the mobile terminal 600 may transmit additional black images added to the left and right sides of an image 1410 displayed on the display 680 of the mobile terminal 600 according to the resolution or aspect ratio of the image display apparatus 100.

Thus, the controller 170 of the image display apparatus 100 may receive the additional black images added to the left and right sides of the image 710 along with the image 710 displayed on the display 680 of the mobile terminal 600, and control to display the additional black images and a mirrored image 1420 in areas Ara, Arb, and Arc of the display 180.

Figure 14C:
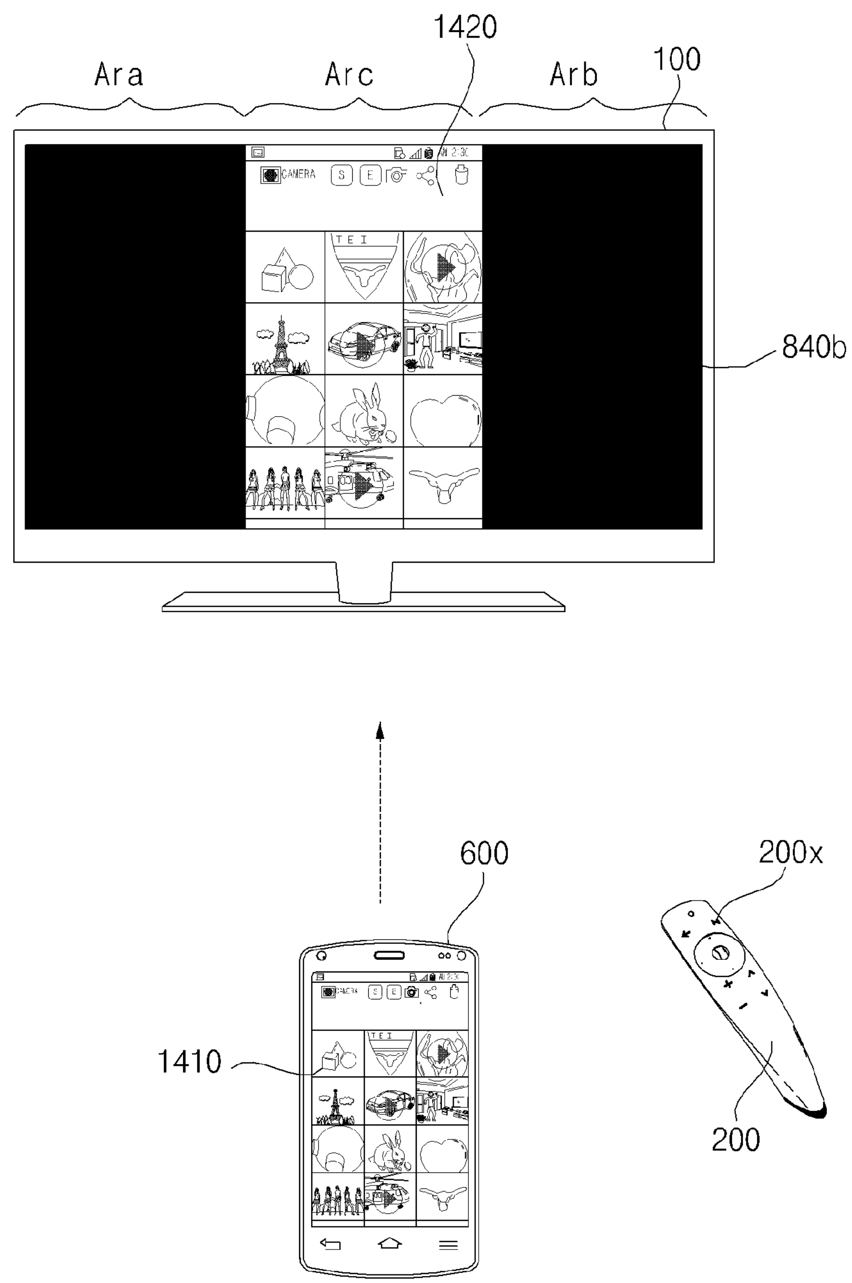

FIG. 14C illustrates an example of displaying additional black images on the left and right sides of the mirrored image 1420.

Meanwhile, the controller 170 of the image display apparatus 100 may display the mirrored image 1420 without signal processing of the input image, such as image editing, as illustrated in FIG. 14C. On the contrary, the mirrored image 720 may be displayed after image editing and the like.

Figure 14D:
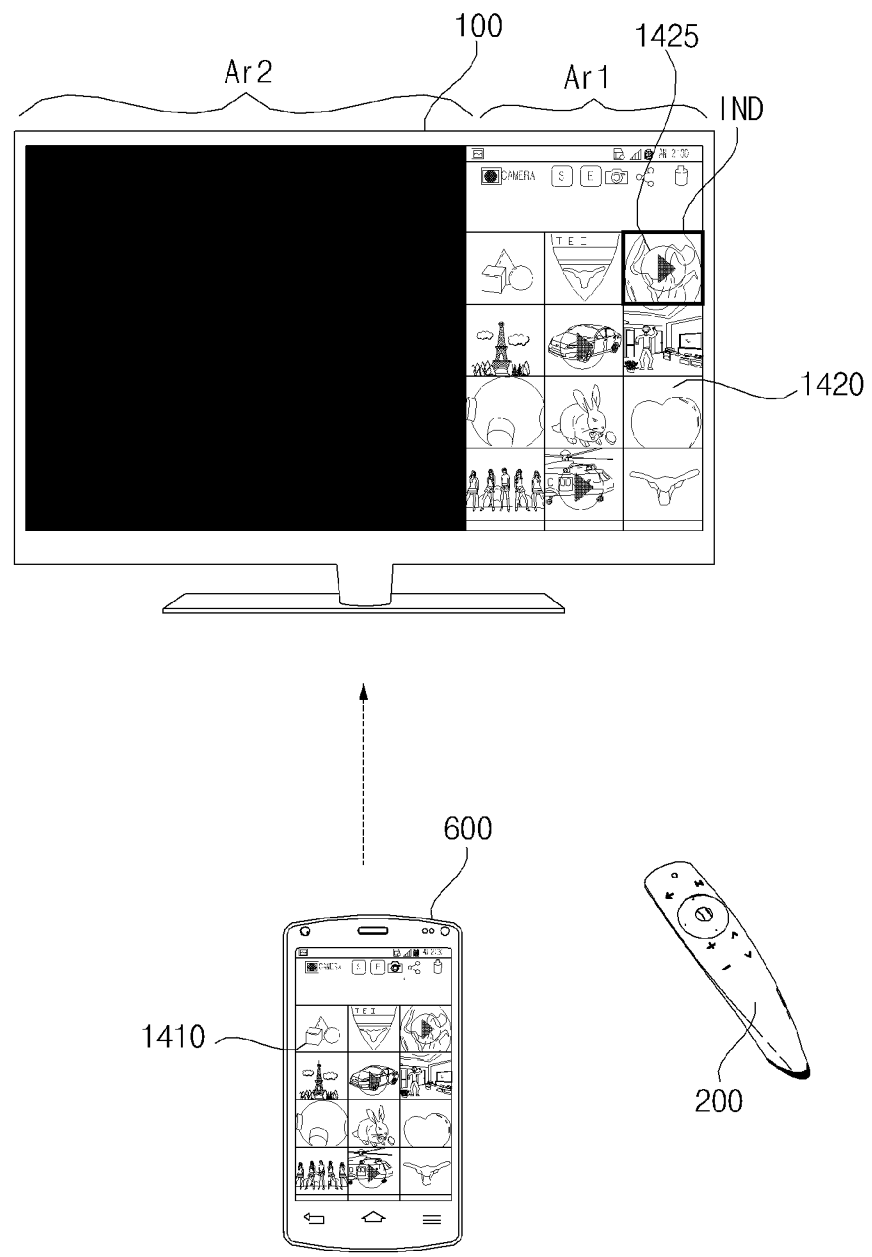

As illustrated in FIG. 14D, it may be controlled that an additional black image is displayed in the area Ar2, and the mirrored image 1420 is displayed in the area Ar1 to the right of the area Ar2.

The controller 170 of the image display apparatus 100 may extract black areas from an input image by an area detection technique, generate an additional black image by combining the left and right black areas, and control to display the additional black image in the area Ar2, and may control to display the mirrored image 1420 in the right area Ar1.

That is, the controller 170 of the image display apparatus 100 may distinguish an image display area from a non-display area in the mirrored image by the area detection technique, and control to display the image display area of the mirrored image shifted to an area of the display 180.

Alternatively or additionally, the controller 170 of the image display apparatus 100 may control to display only the mirrored image 1420 except for the additional black images in the image received from the mobile terminal 600.

The image 1410 displayed on the display 680 of the mobile terminal 600 may be a gallery screen including a plurality of thumbnail images, as illustrated in FIG. 14C.

The gallery screen may include thumbnail images of still images such as photo images and thumbnail images of videos.

Subsequently, upon receipt of a partial zoom-in display input for the mirrored image, the controller 170 of the image display apparatus 100 may control to display a zoomed-in image of a first area of the mirrored image.

The partial zoom-in display input for the mirrored image may be generated by manipulation of a zoom-in display button of the remote controller.

Figure 14E:
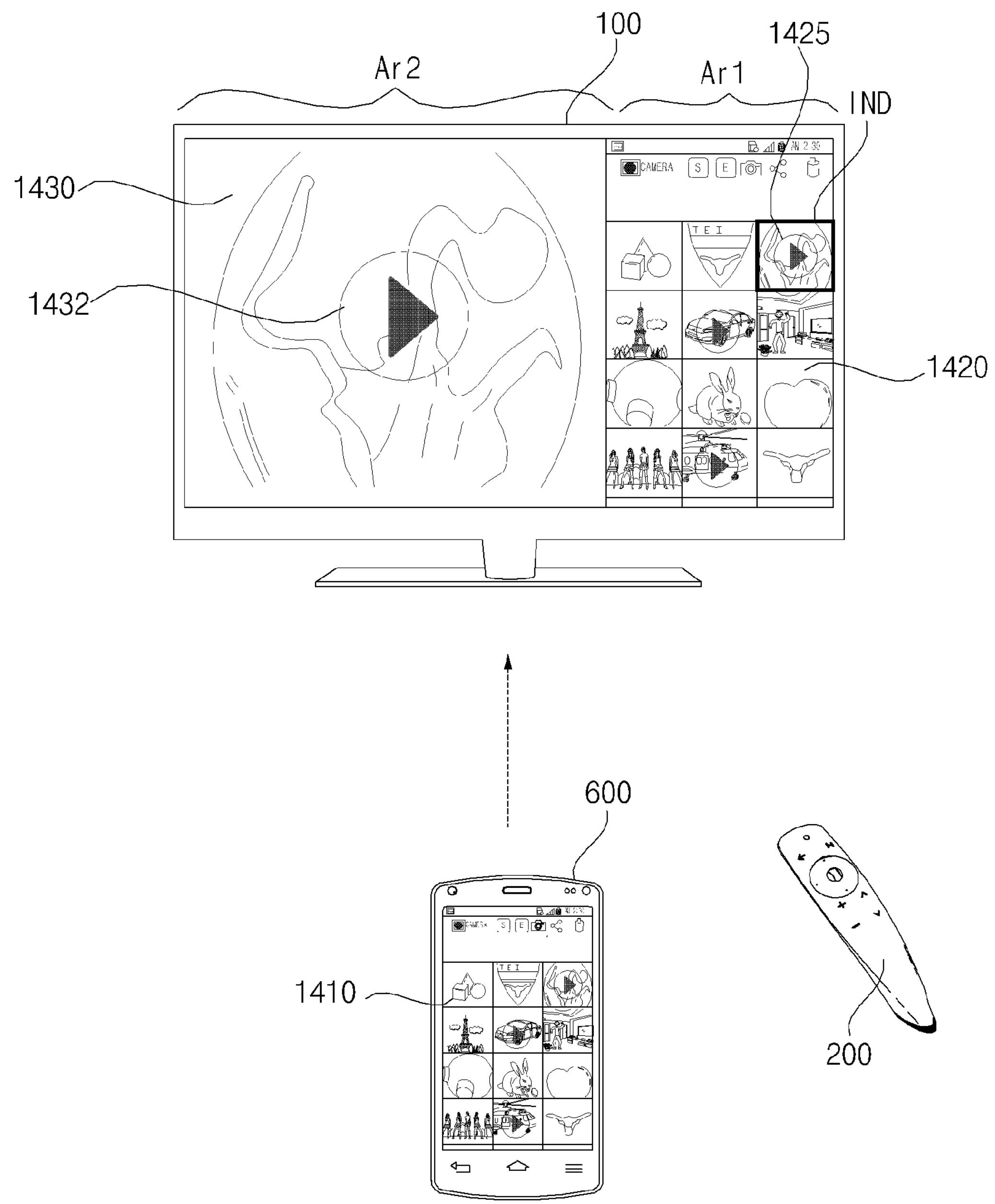

If the partial zoom-in display button 200*x* of the remote controller 200 is manipulated with the mirrored image 1420 displayed as illustrated in FIG. 14C, it may be controlled that only a zoomed-in image 1430 is displayed in the area Ar2 except for the area Ar1 displaying the mirrored image 1420, as illustrated in FIG. 14E. Accordingly, a zoomed-in image of a partial area of a mirrored image may be displayed simply on the display 180.

If the mirrored image1 420 is a gallery image of the mobile terminal 600 as illustrated in FIG. 14D or 14E, the controller 170 of the image display apparatus 100 may control to display the indicator IND for selection of the first area on a thumbnail image 1425, and control to display a zoomed-in image 1430 of the thumbnail image of the video on which the indicator IND is displayed, in the area Ar2 of the display 180, as illustrated in FIG. 14E.

The controller 170 of the image display apparatus 100 may distinguish thumbnail images of still images from thumbnail images of videos by area detection of the mirrored image 1420, and may control to display the indicator IND on the thumbnail image 1425 of the video by default.

Meanwhile, the controller 170 of the image display apparatus 100 may control zoom-in, zoom-out, or shift of the indicator IND according to an input signal of the remote controller 200.

Meanwhile, the zoomed-in image 1430 displayed in the area Ar2 of the image display apparatus 100 may be an image scaled-up by the controller 170 of the image display apparatus 100. Alternatively or additionally, the zoomed-in image 1430 displayed in the area Ar2 of the image display apparatus 100 may be an image that the mobile terminal 600 has scaled up and transmitted.

For example, if the indicator for selecting the first area is displayed on the thumbnail image 1425 of the video in the mirrored image, a zoomed-in image transmission request for the image area of the mirrored image to the mobile terminal 600, and control to display a zoomed-in image received from the mobile terminal 600 on the display 180.

Figure 14F:
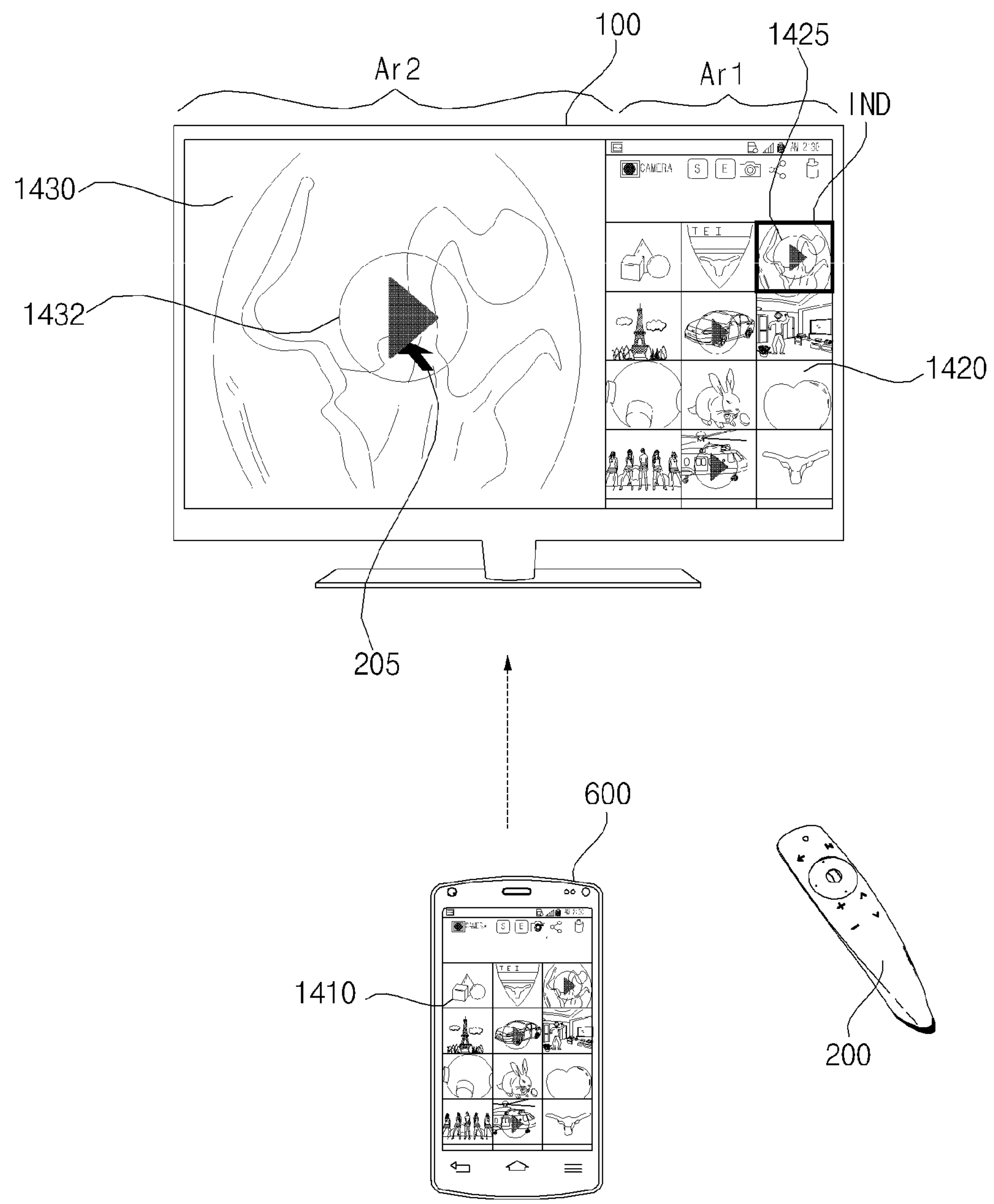
Figure 14G:
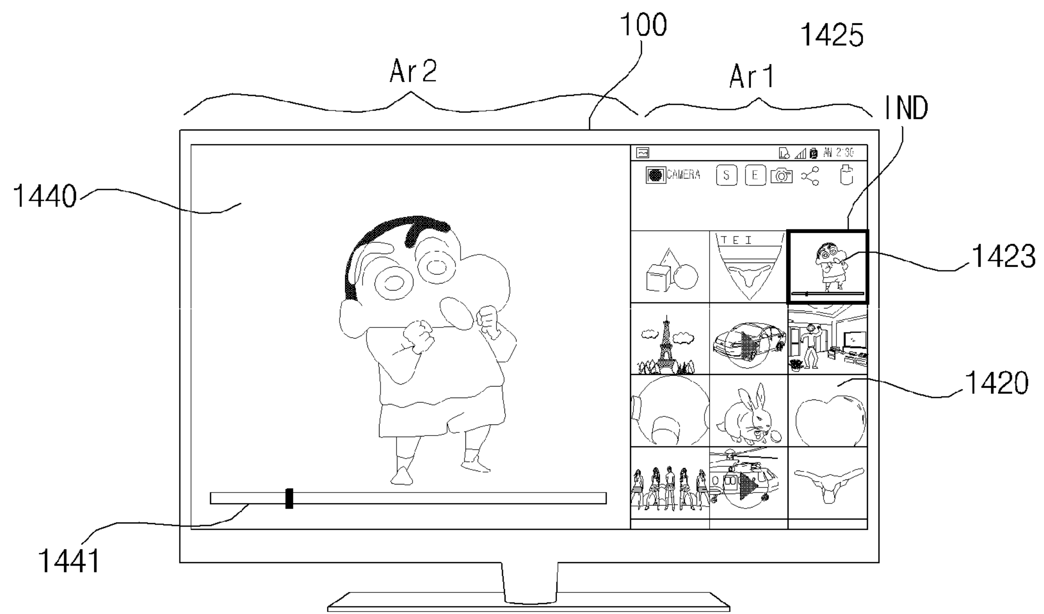
Figure 14G:
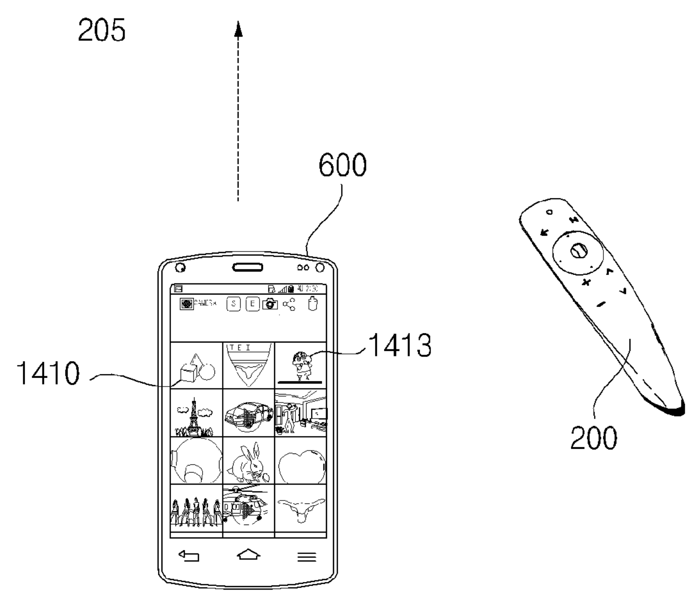

Meanwhile, if a play icon 1432 is selected in the zoomed-in image 430 displayed in the area Ar2 as illustrated in FIG. 14F, the controller 170 of the image display apparatus 100 may control to display a zoomed-in played image 1440 in the area Ar2, as illustrated in FIG. 14G.

FIG. 14F illustrates an example of selecting the play icon 1432 using the pointer 205 representing movement of the remote controller 200.

Meanwhile, upon selection of the play icon 1432, the controller 170 of the image display apparatus 100 may transmit a play request for a video file to the mobile terminal 600, receive a video played in correspondence with the thumbnail image of the video from the mobile terminal 600, and control zoomed-in display of the received video.

In FIG. 14G, as the played image 1440 is displayed in the area Ar2, an image in the mirrored image 1420 in the area Ar1 is also played, and thus displayed as a played image 1423 in the area Ar1. Further, a played image 1413 is also displayed on the display 680 of the mobile terminal 600.

In the area Ar2, a status bar 441 indicating a play progress status may further be displayed in addition to the played image 1440.

That is, in the case where the play icon 1432 is selected as illustrated in FIG. 14F, a small play icon on the mirrored image 1420 is selected, or a small play icon on the mobile terminal 600 is selected, the played images are displayed respectively as illustrated in FIG. 14G.

Figure 14H:
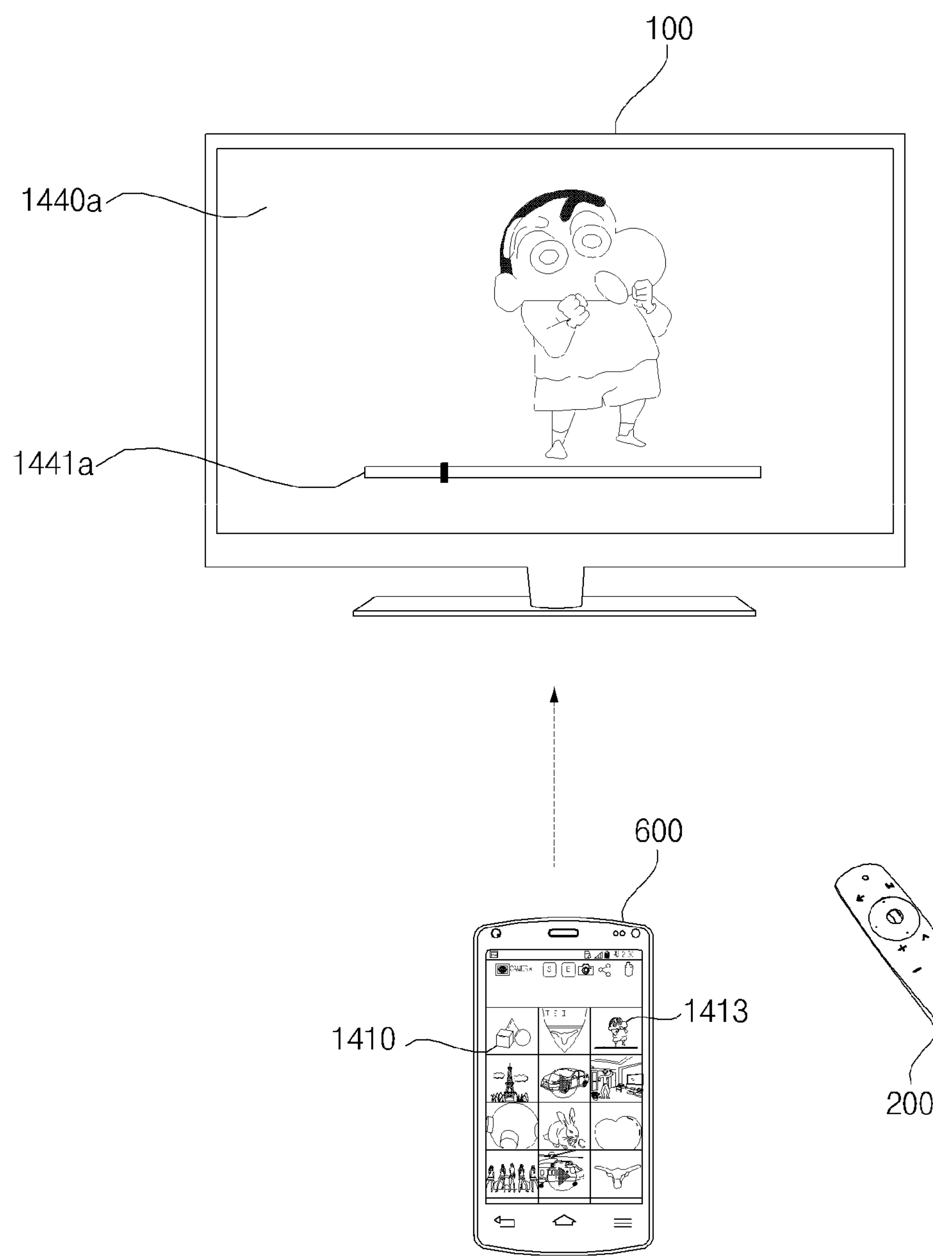

Then, if a predetermined time has elapsed after the zoomed-in image of the first area is displayed, the controller 170 of the image display apparatus 100 may control the displayed mirrored image to disappear and control full-screen display of a zoomed-in image 1440*a* on the entirety of the display 180, as illustrated in FIG. 14H.

FIG. 14H illustrates an example in which the mirrored image 1420 displayed in the area Ar2 disappears, the zoomed-in image 1440 displayed in the area Ar2 is scaled up, and thus the largest zoomed-in image 1440*a* is displayed in full screen on the entirety of the display 180. Therefore, the user may be more immersed in the zoomed-in image 1440*a*.

Unlike the full-screen display in FIG. 14H, if a predetermined time has elapsed after the zoomed-in image of the first area is displayed, the controller 170 of the image display apparatus 100 may control the thumbnail image 1423 of the video in the mirrored image to disappear. Herein, the played image 440 is still displayed.

Figure 14I:
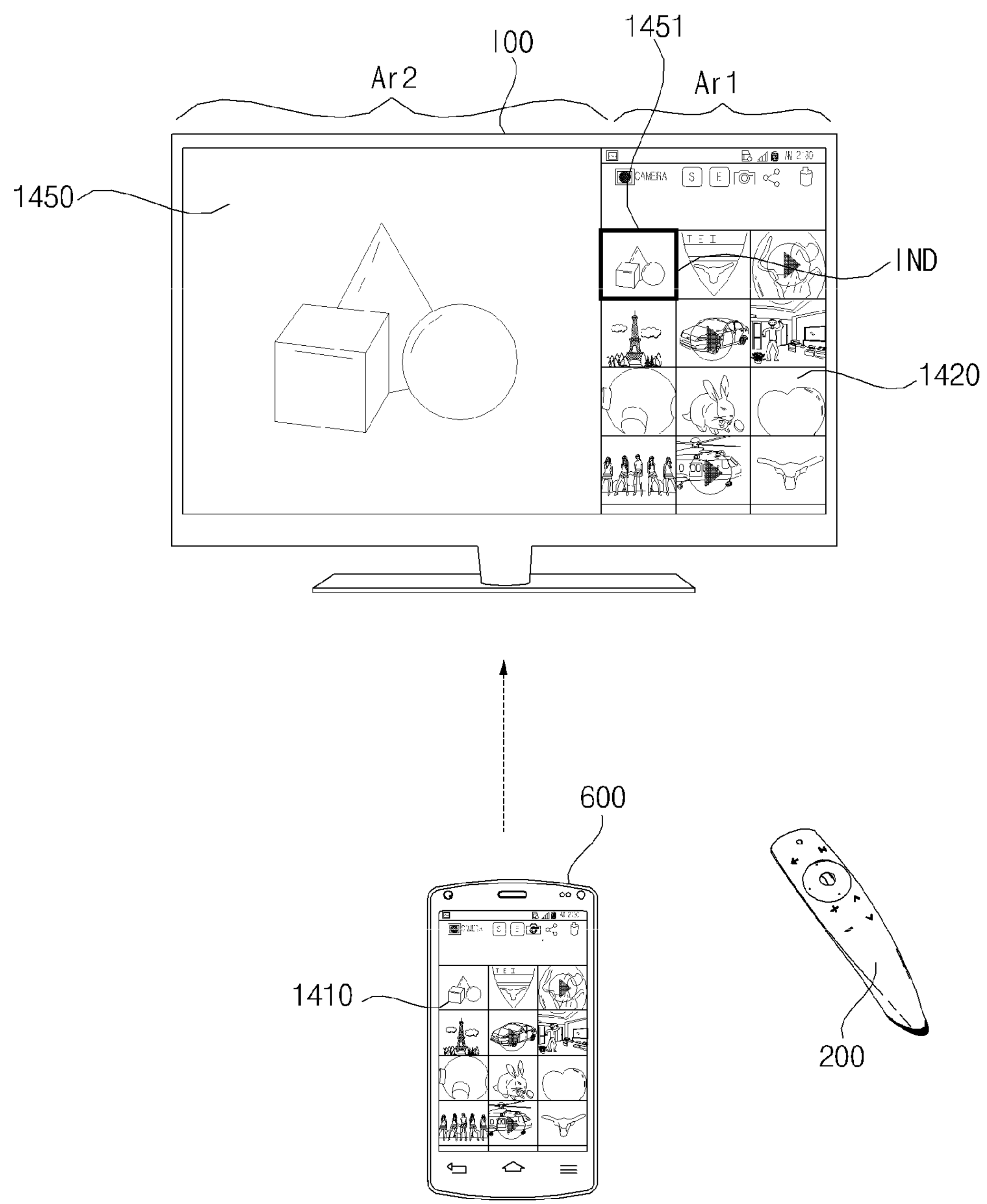

As illustrated in FIG. 14I, the controller 170 of the image display apparatus 100 may control to display the indicator IND on the first thumbnail image 1451 among the plurality of thumbnail images in the mirrored image 1420. Upon receipt of a partial zoom-in display input, the controller 170 of the image display apparatus 100 may control to display a zoomed-in image 1450 of the thumbnail image 1451 highlighted by the indicator IND. Accordingly, the legibility of a thumbnail image is increased during search on a gallery screen of the mobile terminal 600.

As is apparent from the foregoing description, according to an embodiment of the present disclosure, an image display apparatus includes a display, an interface to exchange data with a mobile terminal, and a controller to, when the mobile terminal is mirrored on the image display apparatus, control to display a mirrored image corresponding to an image displayed on the display of the mobile terminal on the display, and upon receipt of a zoom-in display input for a first area of the mirrored image, controlling display of a zoomed-in image of the first area of the mirrored image on the display. Thus, a zoomed-in image of a partial area may be simply displayed during mirroring between the mobile terminal and the image display apparatus.

Particularly, if the mirrored image includes an image area and a text area, it is controlled that an indicator for selection of the first area is displayed on the image area, and a zoomed-in image of the image area is displayed on the display. In this manner, an image may be displayed zoomed-in.

Particularly, a video played in the mobile terminal may be displayed on a zoomed-in screen in the image display apparatus.

Meanwhile, if the mirrored image includes a plurality of thumbnail images, it is controlled that the indicator for selection of the first area is displayed on one of the thumbnail images, and a zoomed-in image of the thumbnail image on which the indicator is displayed on the display. Thus, the thumbnail image may be displayed zoomed-in.

Meanwhile, upon selection of a play icon on the zoomed-in image, a zoomed-in image is played. Thus, a video may be displayed zoomed-in.

Meanwhile, as it is controlled that if a predetermined time has elapsed with the mirrored image and the zoomed-in image displayed together, the mirrored image disappears and the zoomed-in image is displayed in full screen on the display. Accordingly, a user may be more immersed in the zoomed-in image.

Meanwhile, if the mirrored image is divided into an image display area and a non-display area, and a zoomed-in display for the first area being a part of the mirrored image is received, the image display area of the mirrored image may be displayed shifted to an area of the display. Thus, the non-display area may be used for another usage, for example, display of a zoomed-in image.

Meanwhile, if with the zoomed-in image displayed, the mobile terminal is switched from landscape mode to portrait mode or vice versa, it is controlled that the zoomed-in image is still displayed and the mirrored image is changed according to the mode of the mobile terminal. Thus, the zoomed-in image may be displayed continuously, that is, seamless display of the zoomed-in image is possible.

Meanwhile, if the mirrored image includes a plurality of thumbnail images, it is controlled that an indicator for selection of a first area is displayed on one of the thumbnail images, and a zoomed-in image of the thumbnail image on which the indicator is displayed is displayed on the display. Therefore, the thumbnail image may be displayed zoomed-in.

If the mirrored image is a gallery image of the mobile terminal, it is controlled that an indicator for selecting a first area is displayed on a thumbnail image of a video among a plurality of thumbnail images, and a zoomed-in image of the thumbnail image of the video on which the indicator is displayed is displayed on the display 180. Thus, the thumbnail image of the video may simply be displayed zoomed in.

According to another embodiment of the present disclosure, an image display apparatus includes a display, an interface to exchange data with a mobile terminal, and a controller to, upon receipt of a partial zoom-in display input in a state where the mobile terminal is mirrored on the image display apparatus, control to display a zoomed-in image of a partial area of a mirrored image received from the mobile terminal on the display. Thus, a zoomed-in image of a partial area may be simply displayed during mirroring between the mobile terminal and the image display apparatus.

The method for operating an image display apparatus or a mobile terminal according to the present disclosure may be implemented as code that can be written on a computer-readable recording medium and thus read by a processor in the image display apparatus or the mobile terminal. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave such as data transmission over the Internet. The computer-readable recording medium can be distributed over a plurality of computer systems connected to a network so that computer-readable code is written thereto and executed therefrom in a decentralized manner.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. An image display apparatus comprising:

a display;

an interface to exchange data with a mobile terminal; and a controller to, when mirroring with the mobile terminal is performed, control to display a mirrored image corresponding to an image displayed on a display of the mobile terminal, and when a zoom-in display input for a first area being a part of the mirrored image is received in state that the mirrored image is displayed, control to display a zoomed-in image of the first area of the mirrored image on the display, wherein when the mirrored image includes an image area and a text area, the controller controls to display an indicator for selection of the first area in the image area, wherein the controller controls to display the mirrored image and the zoomed-in image together, wherein when the mobile terminal is switched from a landscape mode to a portrait mode or from the portrait mode to the landscape mode in the state that the mirrored image is displayed, the controller controls to continuously display the zoomed-in image, and change of the mirrored image according to a mode of the mobile terminal, and wherein after a predetermined time, the controller controls to stop displaying the mirrored image and to display the zoomed-in image full-screen in an entire area of the display, or the controller controls to continuously display the zoomed-in image and controls the image area of the mirrored image to disappear.

2. The image display apparatus according to claim 1, wherein when the mirrored image includes a plurality of thumbnail images, the controller controls to display the indicator for selection of the first area on one of the plurality of thumbnail images, and controls to display a zoomed-in image of the thumbnail image on which the indicator is displayed, on the display.

3. The image display apparatus according to claim 1, wherein when the indicator for selection of the first area is displayed in the image area of the mirrored image, the controller controls to transmit a zoomed-in image transmission request for the image area of the mirrored image to the mobile terminal, and controls to display a zoomed-in image received from the mobile terminal on the display.

4. The image display apparatus according to claim 1, wherein upon selection of a play icon on the zoomed-in image, the controller controls to play the zoomed-in image.

5. The image display apparatus according to claim 1, wherein upon selection of a play icon on the zoomed-in image, the controller controls to transmit a play request to the mobile terminal, receive an image played in the mobile terminal, and display a zoomed-in image of the played image.

6. The image display apparatus according to claim 1, wherein the controller controls zoom-in, zoom-out, or shift of the indicator according to an input signal from a remote controller.

7. The image display apparatus according to claim 1, wherein the controller divides the mirrored image into an image display area and a non-display area, and controls to display the image display area of the mirrored image, shifted to an area of the display.

8. The image display apparatus according to claim 1, wherein the controller controls to change a display position of the mirrored image according to a shifted display input for the mirrored image.

9. The image display apparatus according to claim 1, wherein when a zoom-in display button of a remote controller is manipulated, the controller controls to display the zoomed-in image of the first area of the mirrored image on the display.

10. The image display apparatus according to claim 1, wherein when the mirrored image is displayed, the controller controls to display an icon for zoomed-in display, and upon selection of the icon for zoomed-in display, the controller controls to display the zoomed-in image of the first area of the mirrored image on the display.

11. The image display apparatus according to claim 1, wherein when the mirrored image is a gallery image of the mobile terminal, the controller controls to display the indicator for selection of the first area on a thumbnail image of a video among a plurality of thumbnail images, and display a zoomed-in image of the thumbnail image of the video on which the indicator is displayed, on the display.

12. The image display apparatus according to claim 11, wherein upon receipt of a play input for the thumbnail image of the video, the controller controls to transmit a play request for the video to the mobile terminal, receive the video played in correspondence with the thumbnail image of the video from the mobile terminal, and display a zoomed-in video of the received video.

13. An image display apparatus comprising;

a display;

an interface to exchange data with a mobile terminal; and a controller to, upon receipt of a partial zoom-in display input in a state where the mobile terminal is mirrored on the image display apparatus, control to display a zoomed-in image of a partial area of a mirrored image received from the mobile terminal on the display, wherein when the mirrored image includes an image area and a text area, the controller controls to display an indicator for selection of the partial area in the image area, wherein the controller controls to display the mirrored image and the zoomed-in image together, wherein when the mobile terminal is switched from a landscape mode to a portrait mode or from the portrait mode to the landscape mode in the state that the mirrored image is displayed, the controller controls to continuously display the zoomed-in image, and change of the mirrored image according to a mode of the mobile terminal, and wherein after a predetermined time, the controller controls to stop displaying the mirrored image and to display the zoomed-in image full-screen in an entire area of the display, or the controller controls to continuously display the zoomed-in image and controls the image area of the mirrored image to disappear.

14. The image display apparatus according to claim 13, wherein when the mirrored image includes a plurality of thumbnail images, the controller controls to display the indicator for selection of a zoom-in area on one of the plurality of thumbnail images, and controls to display a zoomed-in image of the thumbnail image on which the indicator is displayed, on the display.

* * * * *